United States Patent
Zhao et al.

(10) Patent No.: US 12,086,620 B2
(45) Date of Patent: Sep. 10, 2024

(54) METHOD FOR VIRTUAL MACHINE MIGRATION WITH ARTIFICIAL INTELLIGENCE ACCELERATOR STATUS VALIDATION IN VIRTUALIZATION ENVIRONMENT

(71) Applicants: Baidu USA LLC, Sunnyvale, CA (US); KUNLUNXIN TECHNOLOGY (BEIJING) COMPANY LIMITED, Beijing (CN)

(72) Inventors: Zhibiao Zhao, Sunnyvale, CA (US); Yueqiang Cheng, Sunnyvale, CA (US)

(73) Assignees: KUNLUNXIN TECHNOLOGY (BEIJING) COMPANY LIMITED, Beijing (CN); BAIDU USA LLC, Sunnyvale, CA (US)

( * ) Notice: Subject to any disclaimer, the term of this patent is extended or adjusted under 35 U.S.C. 154(b) by 767 days.

(21) Appl. No.: 17/142,946

(22) Filed: Jan. 6, 2021

(65) Prior Publication Data
US 2022/0214903 A1 Jul. 7, 2022

(51) Int. Cl.
*G06F 9/455* (2018.01)
*G06F 9/445* (2018.01)
*G06F 9/48* (2006.01)

(52) U.S. Cl.
CPC ...... *G06F 9/45558* (2013.01); *G06F 9/44505* (2013.01); *G06F 9/4856* (2013.01);
(Continued)

(58) Field of Classification Search
CPC .................................................. G06F 9/45558
(Continued)

(56) References Cited

U.S. PATENT DOCUMENTS 9,811,367 B2 11/2017 Rouwet et al.
10,740,146 B2 8/2020 Mohan
(Continued)

FOREIGN PATENT DOCUMENTS

JP 2009140053 A 6/2009
JP 2009530743 A 8/2009
(Continued)

OTHER PUBLICATIONS

Anonymous, "Single-root input/output virtualization," Wikipedia, Sep. 17, 2020. pp. 1-2, XP055910765, retrieved from the internet: Apr. 8, 2022: URL: https://en.wikipedia.org/w/index.php?title=Single-root_input/output_virtualization&oldid=978867619.
(Continued)

*Primary Examiner* — Mehran Kamran
(74) *Attorney, Agent, or Firm* — WOMBLE BOND DICKINSON (US) LLP

(57) ABSTRACT

Systems and methods are disclosed for migrating a virtual machine (VM) having a virtual function that maps resources of an artificial intelligence (AI) accelerator to the VM. A driver for the AI accelerator can generate a checkpoint of VM processes that make calls to the AI accelerator, and can the checkpoint can include a list and configuration of resources mapped to the AI accelerator by the virtual function. The driver can also access the code, data, and memory of the AI accelerator to generate a checkpoint of the AI accelerator status. When the VM is migrated to a new host, then either, or both, of these checkpoint frames can be used to ensure that resuming the VM on a new host having appropriate AI accelerator resources, can be successful resumed on the new host. One or both checkpoint frames can be captured based upon an event, in anticipation of the need to migrate the VM.

20 Claims, 13 Drawing Sheets

(52) U.S. Cl.
CPC ............... *G06F 2009/4557* (2013.01); *G06F 2009/45591* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | |
|---|---|---|---|
| 11,599,376 B1* | 3/2023 | Viswanathan | G06F 9/3877 |
| 2011/0084973 A1* | 4/2011 | Masood | G06F 9/45558 |
| | | | 345/506 |
| 2012/0324236 A1 | 12/2012 | Srivastava et al. | |
| 2013/0179884 A1* | 7/2013 | Masood | G06F 9/45558 |
| | | | 718/1 |
| 2014/0149494 A1* | 5/2014 | Markley | H04W 4/60 |
| | | | 709/203 |
| 2016/0139944 A1* | 5/2016 | Rouwet | G06F 9/45558 |
| | | | 718/1 |
| 2017/0031784 A1* | 2/2017 | Lee | G06F 11/2028 |
| 2017/0090992 A1* | 3/2017 | Bivens | G06F 9/5072 |
| 2018/0225237 A1* | 8/2018 | Edirisooriya | G06F 9/54 |
| 2018/0232254 A1* | 8/2018 | Mohan | G06F 3/0632 |
| 2020/0356397 A1* | 11/2020 | Kumatagi | G06F 9/45558 |
| 2020/0409603 A1* | 12/2020 | Leng | G06F 3/0673 |
| 2020/0409732 A1* | 12/2020 | Kovacevic | G06F 9/30138 |
| 2021/0004297 A1* | 1/2021 | Scrivner | G06F 16/2379 |
| 2021/0034464 A1* | 2/2021 | Dailey | G06F 12/0868 |
| 2021/0044503 A1* | 2/2021 | Zhang | H04L 41/5025 |
| 2021/0173689 A1* | 6/2021 | Hasbe | G06F 21/53 |
| 2021/0392143 A1* | 12/2021 | Cheng | H04L 41/0893 |
| 2022/0012087 A1* | 1/2022 | Zheng | G06T 1/60 |
| 2022/0075622 A1* | 3/2022 | Xue | G06F 9/3017 |
| 2022/0198296 A1* | 6/2022 | Liu | H04L 67/1001 |
| 2022/0214902 A1* | 7/2022 | Zhao | G06F 9/4856 |
| 2022/0214903 A1* | 7/2022 | Zhao | G06N 20/00 |

FOREIGN PATENT DOCUMENTS

| | | |
|---|---|---|
| JP | 2013235317 A | 11/2013 |
| JP | 2016085663 A | 5/2016 |
| JP | 2016529633 A | 9/2016 |
| JP | 2017515413 A | 6/2017 |
| JP | 2018005576 A | 1/2018 |
| JP | 2018511853 A | 4/2018 |
| WO | 2009107351 A1 | 9/2009 |
| WO | 2018020603 A1 | 2/2018 |
| WO | 2020140268 A1 | 7/2020 |
| WO | 2020157599 A1 | 8/2020 |

OTHER PUBLICATIONS

Anonymous, "Data validation," Wikipedia, Dec. 6, 2020. pp. 1-6, XP055910763, retrieved from the internet: Apr. 8, 2022: URL: https://en.wikipedia.org/w/index.php?title=Data_validation&oldid=992687061.

Anonymous, "Data security," Wikipedia, Dec. 15, 2020, pp. 1-5, Retrieved from the Internet: URL:https://en.wikipedia.org/w/index.php?title=Data_security&oldid=994340996 [retrieved on Jan. 18, 2023].

* cited by examiner

METHOD FOR VIRTUAL MACHINE MIGRATION WITH ARTIFICIAL INTELLIGENCE ACCELERATOR STATUS VALIDATION IN VIRTUALIZATION ENVIRONMENT

TECHNICAL FIELD

Embodiments of the present disclosure relate generally to one or more artificial intelligence accelerators coupled to a host of a virtual machine. More particularly, embodiments of the disclosure relate to migrating a virtual machine that uses the artificial accelerator.

BACKGROUND

Artificial intelligence (AI) models (also termed, "machine learning models") have been widely utilized recently as AI technology has been deployed in a variety of fields such as image classification, medical diagnosis, or autonomous driving. Similar to an executable image or binary image of a software application, an AI model, when trained, can perform an inference based on a set of attributes to classify as features. Training of an AI model can require a substantial investment in collecting, collating, and filtering of data to generate an AI model that yields useful predictions. In addition, the predictions resulting from use of an AI model may contain personal, sensitive data that users would want protected.

Generating a prediction from an AI model can be a computationally intensive process. To provide adequate computational power for one or more users, one or more AI accelerators can be coupled to a host machine of one or more virtual machines. To provide sufficient computing power for a computationally intensive task, such as training an AI model, AI accelerators may be organized in a cluster, and then organized into a plurality of groups, and each group may be assigned to a single virtual machine. For less intensive tasks, a single virtual machine may have a single AI accelerator assigned to it.

For several well-known reasons, a virtual machine may need to be migrated to a different host. Virtual machine migration of the prior art does not protect the status of the one or more AI accelerators during migration. An AI application that generates one or more artificial intelligence tasks, at least some of which are performed on the AI accelerators, may fail or be interrupted after migration to another host. Failures can include failure to capture the configuration, memory content, and computing state of the AI accelerator and failure to capture a computing state of AI tasks within the VM.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
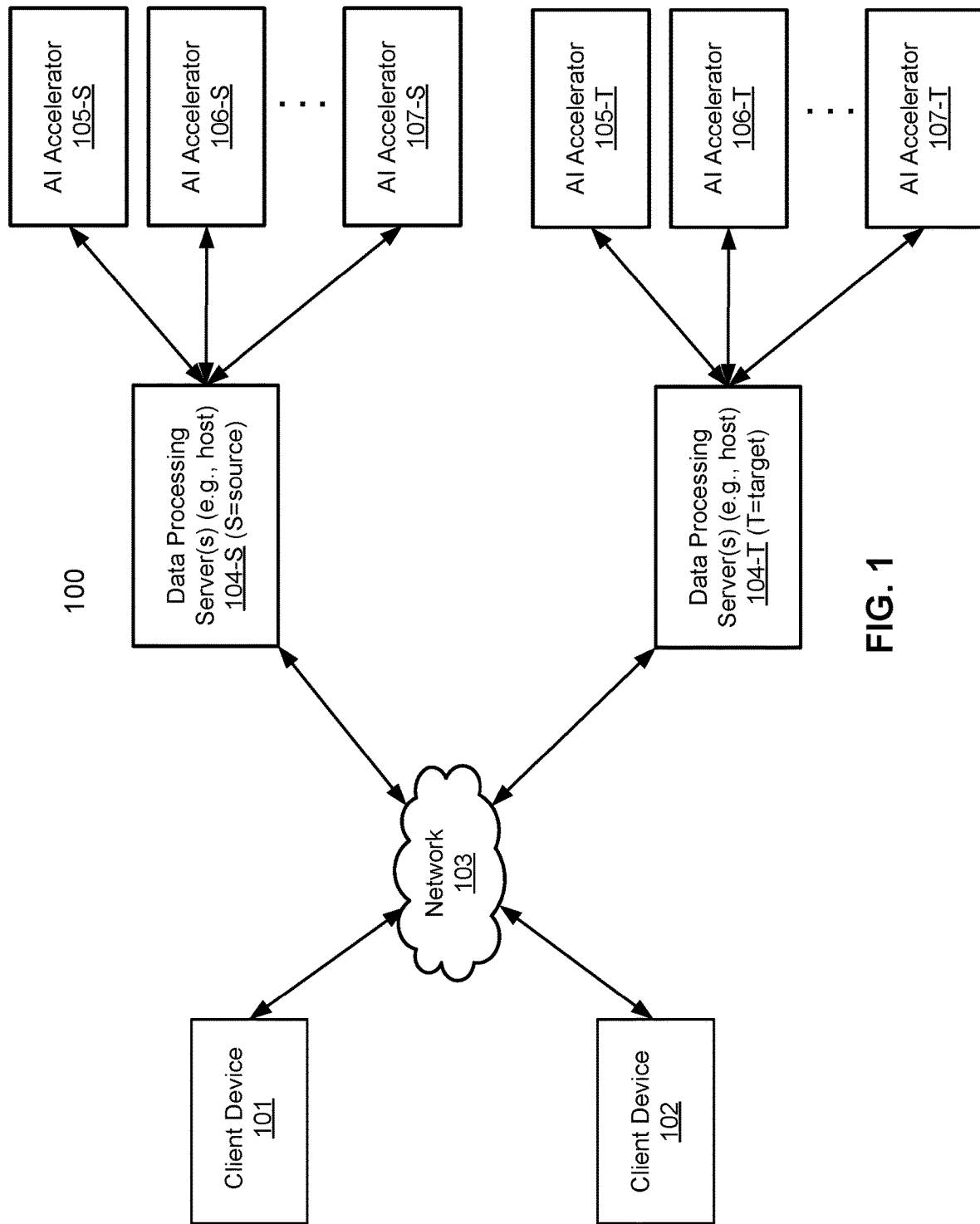
FIG. 1 is a block diagram illustrating a secure processing system that can migrate a virtual machine with checkpoint authentication and/or artificial intelligence (AI) accelerator status validation, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of an artificial intelligence (AI) accelerator to increase processing throughput of certain types of operations that may be offloaded (or delegated) from a host device to the AI accelerator. The host device hosts one or more virtual machines (VM). At least one VM on the host can be associated with a virtual function that maps resources of an AI accelerator to the VM via the virtual function. The virtual function enumerates the resources within the AI accelerator that are mapped to the VM and the configuration, within the accelerator, of those resources. A driver within the VM can track scheduling and computing status of tasks that are to be processed by the AI accelerator. The driver can also obtain the code, data, and memory of the AI accelerator mapped to the VM.

A "virtual function," as used herein, is a mapping of a set of resources within an artificial intelligence (AI) accelerator or a group of AI accelerators in a cluster of AI accelerators to one virtual machine. The set of resources is referred to herein, individually and collectively, as "AI resources." An AI accelerator or cluster of AI accelerators is referred to herein as an "AI accelerator" unless a distinction is being described between one AI accelerator and a cluster of AI accelerators.

An AI accelerator can be a general-purpose processing unit (GPU), an artificial intelligence (AI) accelerator, math coprocessor, digital signal processor (DSP), or other type of processor. An AI accelerator can be a proprietary design, such as a Baidu® AI accelerator, or another GPU, and the like. While embodiments are illustrated and described with host device securely coupled to one or more AI accelerators, the concepts described herein can be implemented more generally as a distributed processing system.

A plurality of AI accelerators can be linked in a cluster that is managed by a host device having a driver that translates application program processing requests into processing tasks for one or more of the AI accelerators. The host device may support one or more virtual machines (VMs) each having a user associated with the corresponding VM. The driver can implement the virtual function that maps resources of the AI accelerator to the VM. The driver can include a scheduler that schedules application processing requests from a plurality of VMs for processing by one or more of the AI accelerators. In one embodiment, the driver can analyze processing requests in the scheduler to determine how to group the one or more AI accelerators in the cluster, and whether to instruct one or more AI accelerators to unlink from a group and go into a low-power state to reduce heat and conserve energy.

The host device and the AI accelerator can be interconnected via a high-speed bus, such as a peripheral component interconnect express (PCIe), or other high-speed bus. The host device and AI accelerator can exchange keys and initiate a secure channel over the PCIe bus before performing operations of the aspects of the invention described below. Some of the operations include the AI accelerator using an artificial intelligence (AI) model to perform inferences using data provided by the host device. Before the AI model inferences are trusted by the host device, the host device can engage the AI accelerator to perform one or more validation tests, described below, including determining a watermark of the AI model. In some embodiments and operations, the AI accelerator is not aware that the host device is testing the validity of results produced by the AI accelerator.

A host device may include central processing unit (CPU) coupled to one or more AI accelerators. Each AI accelerator may be coupled to the CPU over a bus or interconnect. An AI accelerator may be implemented in a form of an application-specific integrated circuit (ASIC), a field programmable gate array (FPGA) device, or other forms of integrated circuits (ICs). Alternatively, the host processor may be a part of a primary data processing system while an AI accelerator may be one of many distributed systems as secondary systems that the primary system can offload its data processing tasks remotely over a network (e.g., cloud computing systems such as a software as a service (SaaS) system, or a platform as a service or (PaaS) system). A link between a host processor and an AI accelerator may be a peripheral component interconnect express (PCIe) link or a network connection such as Ethernet connection. Each AI accelerator can include one or more link registers that enable (link up) or disable (link down) a communication link with another AI accelerator.

In a first aspect, a computer-implemented method of migrating a source virtual machine (VM-S) that is executing an application that accesses a virtual function of an artificial intelligence (AI) accelerator can include storing a checkpoint of a state of the VM-S into a storage of a plurality of states of the VM-S. Each state of the VM-S can include a state of the resources of the VM-S, a state of the application, and a state of the virtual function of the AI accelerator that maps AI resources to the VM-S. In response to receiving a command to migrate the VM-S and the virtual function, and receiving a selection of a checkpoint of a state of the VM-S to use in performing the migration, the method can further include recording, then stopping, one or more executing AI tasks, and migrating the VM-S, application, the one or more AI tasks, and the virtual function to a target VM (VM-T) on a target host, using selected checkpoint. In response to receiving a notification from the target hypervisor that the checkpoint was successfully validated by the target hypervisor, and that the migration was successfully completed, the recorded one or more AI tasks and the application can be restarted on the VM-T. The virtual function maps resources of the AI accelerator to the VM-S, and a user of the VM-S is the only user that can access the resources of the AI accelerator whose resources are mapped by the virtual function to the VM-S. In an embodiment, the virtual function maps resources of a plurality of AI accelerators to the VM-S, and the checkpoint includes a communication configuration between the plurality of AI accelerators, and the user of the VM-S is the only user who can access the resources of the plurality of AI accelerators mapped by the virtual function to the VM-S. In an embodiment, the method further includes, receiving a notification from the target hypervisor that the migrating of the VM-S is complete and the one or more recorded AI tasks have been successfully restarted. In response to the notification, a post-migration clean-up of the VM-S can be performed. The post-migration clean-up can include erasing at least the secure memory of the AI accelerator, including any AI inferences, AI models, secure computations, or portions thereof, and erasing the memory of the VM-S associated with the AI virtual function, and any calls to the virtual function by the application.

Validating the signature and freshness date of the checkpoint can include decrypting the signature of the checkpoint using a public key of the VM-S, determining that a date and time stamp of the checkpoint is within a threshold date and time range, and validating a hash of the checkpoint of the VM-S. In an embodiment, the checkpoint can include a recording of one or more executing AI tasks, configuration information of resources within the one or more AI accelerators communicatively coupled to the VM-S, a date and time stamp of the checkpoint, and a snapshot of memory of the VM-S, including the virtual function, scheduling information, and communication buffers within the one or more AI accelerators.

In a second aspect, a method of migrating a source virtual machine (VM-S) that is executing an application that accesses a virtual function (VF) of an artificial intelligence (AI) accelerator includes receiving, by a hypervisor of a target host, a checkpoint from the source virtual machine (VM-S) associated with the virtual function (VF) that maps artificial intelligence (AI) processor resources to the VM-S, and receiving a request to host the VM-S as a target virtual machine (VM-T). The hypervisor of the target host allocates and configures resources for hosting VM-S and the VF of VM-S, as VM-T in accordance with the checkpoint. The hypervisor of the target host receives frames of data of the VM-S and stores the frames of data to generate the VM-T. The hypervisor of the target host receives a recorded state of unfinished AI tasks of the VM-S and restarts the unfinished AI tasks on VM-T. In an embodiment, validating the checkpoint of the VM-S and VF includes decrypting a signature of the checkpoint with a public key of the VM-S, determining that a date and time stamp of the checkpoint falls within a predetermined range, and recomputing a hash of the checkpoint and determining whether the recomputed hash matches the hash stored in the checkpoint. In response to successful validation of the checkpoint, migrating of the VM-S to the hypervisor of the target host proceeds, generating VM-T at the target host.

In a third aspect, a computer-implemented method of migrating a source virtual machine (VM-S) that is executing an application that accesses a virtual function of an artificial intelligence (AI) accelerator includes: in response to receiving a command to migrate the VM-S and the virtual function, and in response to receiving a selection of a checkpoint of the VM-S and virtual function to use in performing the migration, recording, then stopping, one or more executing AI tasks of the application. The method further includes generating, or selecting, a status of the AI accelerator associated with the virtual function, then transmitting the checkpoint and the status of the AI accelerator to a hypervisor of a target host to generate the migrated target virtual machine (VM-T).

In response to receiving a notification that the target host validated the checkpoint and AI accelerator status, and the target host has generated and configured resources for generating VM-T, the target host migrates the VM-S and virtual function to the VM-T. The migrating includes the target host loading the AI accelerator with data from the AI accelerator status frame. In an embodiment, the method further includes, in response to receiving a notification that the VM-T has restarted the application and AI tasks, performing a post-migration cleanup of the VM-S and virtual function. The post-migration clean-up at VM-S can include (1) erasing at least the secure memory of the AI accelerator, including any AI inferences, AI models, intermediate results of secure computations, or portions thereof; and (2) erasing the memory of the VM-S associated with the virtual function, and any calls to the virtual function by the application. In an embodiment, storing a checkpoint of a state of the VM-S and virtual function can include storing a checkpoint of a state of the VM-S and VF into a storage of a plurality of checkpoints of the VM-S. Each checkpoint of the VM-S can include a state of the resources of the VM-S, a state of the application, and a state of the virtual function associated with the resources of AI accelerator. In an embodiment, the checkpoint can further include a recording of one or more executing AI tasks, configuration information of resources within the AI accelerator that is communicatively coupled to the VM-S, a snapshot of memory of the VM-S. The checkpoint can further include the virtual function scheduling information and communication buffers within the one or more AI accelerators, and a date and time stamp of the checkpoint. In an embodiment, generating a status of the AI accelerator can include: (1) storing, in the AI accelerator status, a date and time stamp of the status, (2) storing, in the AI accelerator status, contents of memory within the AI accelerator, including one or more registers associated with a processor of the AI accelerator, and a cache, queue, or pipeline of pending instructions to be processed by the AI accelerator, and (3) generating a hash of the status of the AI accelerator, and digitally signing the status, hash, and date and time stamp. In an embodiment, the AI accelerator status can further include one or more register settings indicating one or more other AI accelerators in a cluster of AI accelerators that the AI accelerator is configured to communicate with. In an embodiment, validating the signature and freshness of the AI accelerator status can include decrypting the signature of the AI status using a public key of the VM-S, determining that a date and time stamp of the AI accelerator status is within a threshold date and time range, and validating a hash of the AI accelerator status.

Any of the above functionality can be programmed as executable instructions onto one or more non-transitory computer-readable media. When the executable instructions are executed by a processing system having at least one hardware processor, the processing systems causes the functionality to be implemented. Any of the above functionality can be implemented by a processing system having at least one hardware processor, coupled to a memory programmed with executable instructions that, when executed, cause the processing system to implement the functionality.

FIG. 1 is a block diagram illustrating a secure processing system 100 that can migrate a virtual machine with checkpoint authentication and/or artificial intelligence (AI) accelerator status validation, according to one embodiment. Referring to FIG. 1, system configuration 100 includes, but is not limited to, one or more client devices 101-102 communicatively coupled to a source data processing (DP) server 104-S (e.g. host), and a target data DP server 104-T, over network 103. DP server 104-S can host one or more clients. The one or more clients can be virtual machines. Any virtual machine on DP server 104-S can be migrated to a target DP server 104-T, as described herein.

Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be virtual machines on a DP server 104-S or 104-T. Network 103 may be any type of network such as a local area network (LAN), a wide area network (WAN) such as the Internet, a high-speed bus, or a combination thereof, wired or wireless.

Server(s) (e.g., host) 104-S and 104-T (collectively, DP servers 104, unless otherwise stated) may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by AI accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client can be a user application of client device 101 (e.g., Web browser, an application). The client may send or transmit an instruction (e.g., AI training, AI inference instruction, etc.) for execution to server 104 and the instruction is received by server 104 via the interface over network 103. In response to the instruction, server 104 communicates with AI accelerators 105-107 to fulfill the execution of the instruction. A source DP server 104-S can be communicatively coupled to one or more AI accelerators. A client virtual machine hosted by DP server 104-T that runs an application that uses one or more of AI accelerators 105-T . . . 107-T can be migrated to target DP server 104-T to run on corresponding AI accelerators 105-T . . . 107-T. In some embodiments, the instruction is a machine learning type of instruction where AI accelerators, as dedicated machines or processors, can execute the instruction many times faster than execution by general purpose processor. Server 104 thus can control/manage an execution job for the one or more AI accelerators in a distributed fashion. Server 104 then returns an execution result to a client device 101-102 or a virtual machine on the server 104. An AI accelerator may include one or more dedicated processors such as a Baidu® artificial intelligence (AI) chipset available from Baidu, Inc.® or alternatively, the AI accelerator may be an AI chipset from another AI chipset provider.

According to one embodiment, each of the applications accessing any of AI accelerators 105-S . . . 107-S or 105-T . . . 107-T (collectively, 105 . . . 107, unless otherwise indicated) hosted by data processing server 104 (also referred to as a host) may verify that the application is provided by a trusted source or vendor. Each of the applications may be launched and executed within a user memory space and executed by a central processing unit (CPU) of host 104. When an application is configured to access any one of the AI accelerators 105-107, an obscured connection can be established between host 104 and the corresponding one of the AI accelerator 105-107, such that the data exchanged between host 104 and AI accelerators 105-107 is protected against attacks from malware/intrusions.

Figure 2A:
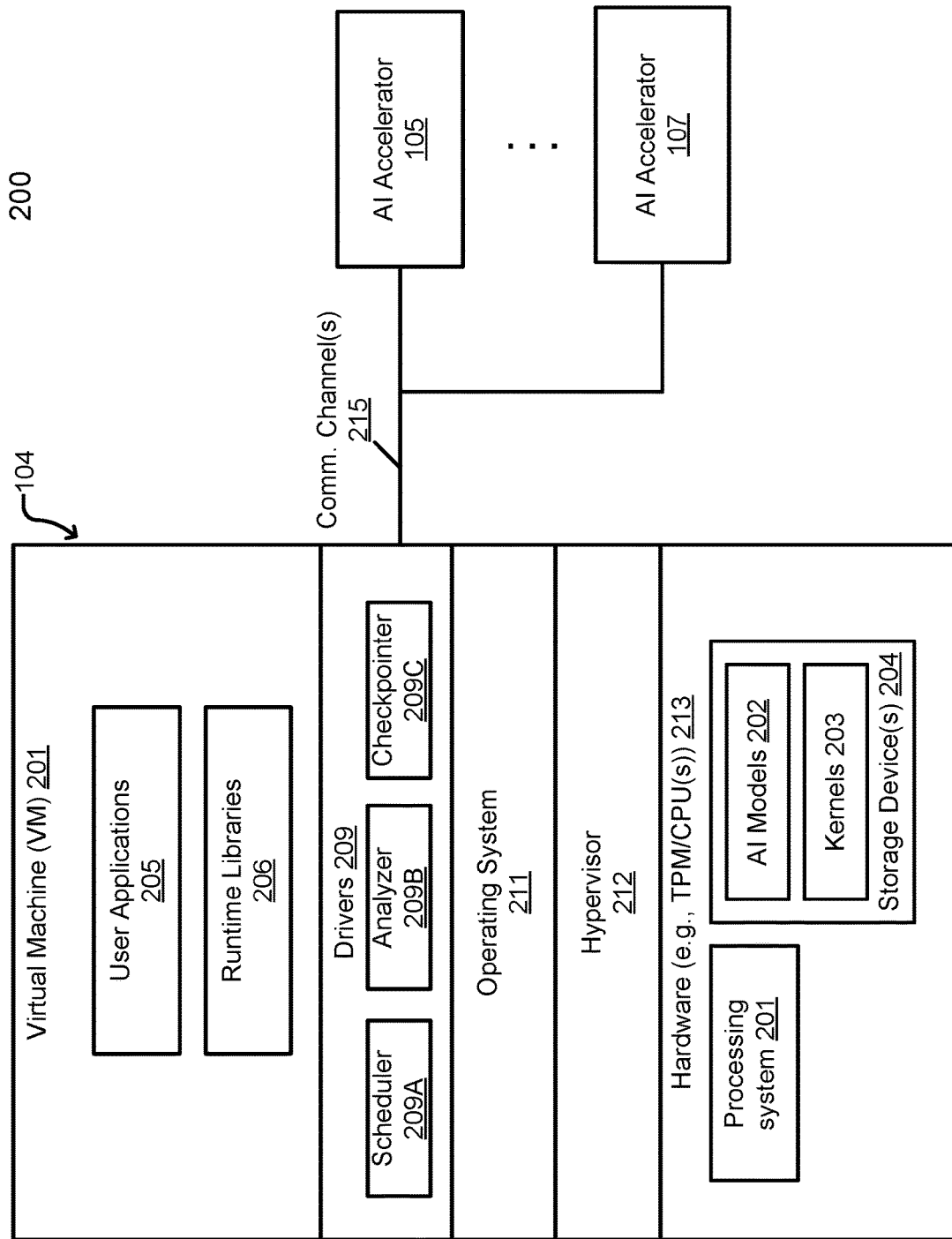
FIGS. 2A and 2B are a block diagrams illustrating a secure computing environment between one or more hosts and one or more artificial intelligence accelerators, according to one embodiment.

FIG. 2A is a block diagram illustrating a secure computing environment 200 between one or more hosts and one or more artificial intelligence (AI) accelerators, according to some embodiments. In one embodiment, system 200 provides a protection scheme for obscured communications between host 104 and AI accelerators 105-107 with or without hardware modifications to the AI accelerators 105-107. Host machine or server 104 can be depicted as a system with one or more layers to be protected from intrusion such as user application(s) 205, runtime libraries 206, driver(s) 209, operating system 211, hypervisor 212, and hardware 213 (e.g., central processing unit (CPU) 201 and storage device(s) 204). Below the applications 205 and run-time libraries 206, one or more drivers 209 can be installed to interface to hardware 213 and/or to AI accelerators 105-107.

A driver 209 can include a scheduler 209A that schedules processing tasks requested by one or more user applications 205. Driver 209 can further include an analyzer 209B with logic that analyzes processing tasks scheduled for execution on the AI accelerators 105-107 to determine how to best configure the AI accelerators 105-107 based upon scheduling criteria such as processing throughput, energy consumption, and heat generated by the AI accelerators. Driver 209 can further include one or more policies directed to configuring the AI accelerators to achieve the scheduling criteria. Configuring AI accelerators can include grouping AI accelerators into one or more groups, removing one or more AI accelerators from one or more groups. Driver 209 can further include checkpointer 209C. Checkpointer 209C can snapshot a state of user application 205, memory within VM 201, scheduler 209A state, analyzer 209B state, and a configuration of a virtual function within VM 201. A virtual function, as used herein, is a mapping of a set of resources within an artificial intelligence (AI) accelerator, e.g. 105, or a cluster of AI accelerators 105 . . . 107 to a virtual machine. The virtual function is described below with reference to FIGS. 3, 4A, and 4B.

An AI accelerator that is not assigned to a group of AI accelerators within a cluster of AI accelerators can be set to a low-power state to save energy and reduce heat. A low-power state can include reducing a clock speed of the AI accelerator or entering a standby state wherein the AI accelerator is still communicatively coupled to the host device and can be brought to a run state wherein the AI accelerator is ready to receive processing tasks from the host device. AI accelerators not assigned to a group in a cluster can alternatively be left in a powered-up state such that driver 209 can assign work to a single AI accelerator that is not a member of a group of AI accelerators.

Configuring AI accelerators can further include instructing one or more AI accelerator to generate a communication link (link up) with one or more other AI accelerators to form a group of AI accelerators within a cluster of AI accelerators. Configuring AI accelerators can further include instructing one or more DP accelerate to break a communication link (link down) between the AI accelerator and one or more other AI accelerators. Link up and link down of an AI accelerator can be governed by one or more link registers in each AI accelerator.

In a policy-based partition embodiment, an AI accelerator configuration policy is a single policy that describes communication links (up or down) for each AI accelerator. While configuration of each AI accelerator can be (and, typically will be) different from the other AI accelerators, the configuration of each AI accelerator is included within the single policy, and each AI accelerator in the cluster receives the same policy. Each AI accelerator then configures itself according to the portion of the policy that describes configuring the AI accelerator. Policy-based partition can be based on an analysis of processing tasks in the scheduler 209A. The analysis can determine an optimal allocation of AI accelerators into groups. In one embodiment, time-share processing tasks within a group of processors, or across multiple groups of processors, to optimize throughput, minimize energy consumption and generated heat. Advantages of policy-based partitioning of AI accelerators into groups include fast partitioning of AI accelerators, flexible scheduling of processing tasks within, or across, groups, time-sharing of AI accelerators and time-sharing of groups.

In a dynamic partition embodiment, an AI accelerator policy is generated for each AI accelerator. The driver 209 can dynamically change the configuration of each AI accelerator, including reorganizing groups of AI accelerators, removing one or more AI accelerators from all groups and setting those AI accelerators to a low-power state. In the dynamic partition embodiment, each group of AI accelerators is assigned to a single user rather than time-sharing the AI accelerators between users. Driver 209 can include analyzer 209B that analyzes processing tasks within the scheduler 209A to determine an optimal grouping of AI accelerators. The analysis can generate a configuration for one or more AI accelerators and the configuration can be deployed to each such AI accelerator to be reconfigured. Advantages of dynamic partitioning include energy saving through setting one or more processors to a low-power state, and user-dedicated processing for an AI accelerator or a group of AI accelerators, rather than time-slicing between users.

Hardware 213 can include a processing system 201 having one or more processor(s) 201. Hardware 213 can further include and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object.

A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 may be a CPU system which can control and manage execution of jobs on the host machine 104 and/or AI accelerators 105-107. In order to secure/obscure a communication channel 215 between AI accelerators 105-107 and host machine 104, different components may be required to protect different layers of the host system that are prone to data intrusions or attacks.

System 200 includes host system 104 and AI accelerators 105-107 according to some embodiments. There can be any number of AI accelerators. AI accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 optionally equipped with a security module (such as an optional trusted platform module (TPM)) within host machine 104. The optional TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the optional TPM chip and cannot be accessed by software. Critical sections of firmware and software can then be hashed by the EK or EC before they are executed to protect the system against unauthorized firmware and software modifications. The optional TPM chip on the host machine can thus be used as a root of trust for secure boot.

The optional TPM chip can also secure driver(s) 209 and operating system (OS) 211 in a working kernel space to communicate with the AI accelerators 105-107. Here, driver 209 is provided by an AI accelerator vendor and can serve as a driver 209 for the user applications 205 to control a communication channel(s) 215 between host and AI accelerators. Because the optional TPM chip and secure boot processor protects the OS 211 and drivers 209 in their kernel space, TPM also effectively protects the driver 209 and OS 211.

Since communication channels 215 for AI accelerators 105-107 may be exclusively used by the OS 211 and driver 209, communication channels 215 can be secured through the optional TPM chip. In one embodiment, communication channels 215 include a peripheral component interconnect (PCI) or peripheral component interconnect express (PCIE) channel. In one embodiment, communication channels 215 are obscured communication channels.

Runtime libraries 206 can convert application programming interface (API) calls to commands for execution, configuration, and/or control of the AI accelerators. In one embodiment, runtime libraries 206 provide a predetermined set of (e.g., predefined) kernels for execution by the user applications. In one embodiment, the kernels may be stored in storage device(s) 204 as kernels 203.

The operating system(s) 211 may be any Linux® distributions, UNIX®, Windows® OS, or Mac® OS, or other operating system.

The system can boot up through an optional TPM-based secure boot. The optional TPM secure boot ensures only a signed/certified operating system 211 and accelerator driver 209 are launched in a kernel space that provides the accelerator services. In one embodiment, the operating 211 system can be loaded through a hypervisor (212). A hypervisor or a virtual machine manager 212 is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, optional TPM secure boot may fail to boot up and instead shuts down the system.

After booting, runtime libraries 206 run a user application 205. In one embodiment, user application 205 and runtime libraries 206 are statically linked and launched together. In another embodiment, runtime library 206 is launched first and then user application 205 is dynamically loaded. Statically linked libraries are libraries linked to an application at compile time. Dynamic loading can be performed by a dynamic linker. Dynamic linker loads and links shared libraries for running user applications at runtime. Here, user applications 205 and runtime libraries 206 are visible to each other at runtime, e.g., all process data are visible to each other.

In one embodiment, the user application 205 can only call a kernel from a set of kernels as predetermined by runtime libraries 206. In another aspect, user application 205 and runtime libraries 206 are hardened with a side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits.

In one embodiment, the set of kernels 203 include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm.

Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations.

Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

In summary, system 200 provides multiple layers of protection for AI accelerators (for data transmissions including machine learning models, training data, and inference outputs) from loss of data confidential and integrity. System 200 can include an optional TPM-based secure boot protection layer and a kernel validation/verification layer. System 200 can include applications that use side-channel free algorithms so as to defend against side channel attacks, such as cache based side channel attacks.

Runtime 206 can provide obfuscation kernel algorithms to obfuscate data communication between a host 104 and AI accelerators 105-107. In one embodiment, the obfuscation can be paired with a cryptography scheme. In another embodiment, the obfuscation is the sole protection scheme and cryptography-based hardware is rendered unnecessary for the AI accelerators.

Figure 2B:
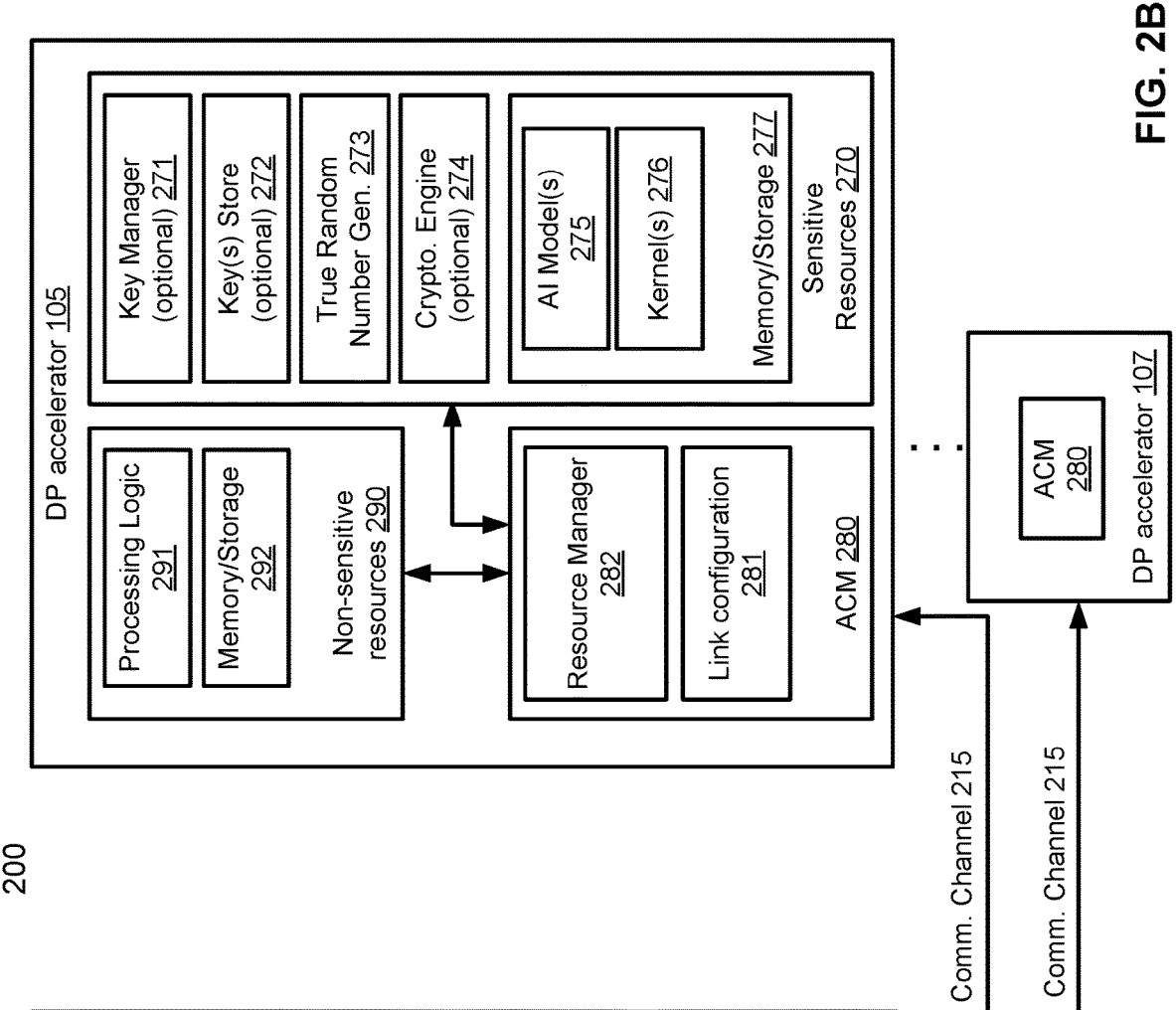
Figure 2B:
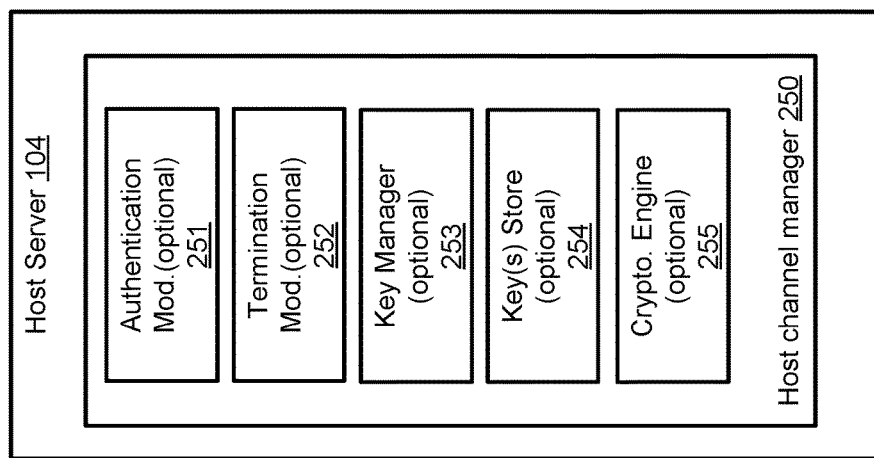

FIG. 2B is a block diagram illustrating a secure computing environment between one or more hosts and one or more artificial intelligence (AI) accelerators, according to one embodiment. In one embodiment, host channel manager (HCM) 250 includes optional authentication module 251, optional termination module 252, optional key manager 253, optional key(s) store 254, and optional cryptography engine 255. Optional authentication module 251 can authenticate a user application running on host server 104 for permission to access or use a resource of an AI accelerator 105. HCM 250 can communicate with accelerator channel manager (ACM) 280 of AI accelerator 215 via communication channel 215.

Optional termination module 252 can terminate a connection (e.g., channels associated with the connection would be terminated). Optional key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to an AI accelerator 105. Each application can utilize a plurality of session keys, where each session key is for a secure channel corresponding to an AI accelerator (e.g., accelerators 105-107). Optional key(s) store 254 can store encryption asymmetric key pairs or symmetric keys. Optional cryptography engine 255 can encrypt or decrypt a data packet for the data exchanged through any of the secure channels. Note that some of these modules can be integrated into fewer modules.

In one embodiment, AI accelerator 105 includes ACM 280, non-sensitive resources 290, and sensitive resources 270. ACM 280 is a counterpart module corresponding to HCM 250 responsible for managing communications between host 104 and AI accelerator 105 such as, for example, resource access control. ACM 280 includes a link configuration module 281 that cooperates with HCM 250 of host server 104 to establish communication channel 215 between host server 104 and AI accelerator 105. ACM 280 further includes resource manager 282. Resource manager 282 enforces restricted access to sensitive resources 270 and non-sensitive resources 290. In one embodiment, sensitive resources 270 occupy a first range of address space within AI accelerator 105. Non-sensitive resources 290 occupy a second range of address space within AI accelerator 105. In one embodiment, the first and second address spaces are mutually exclusive and non-overlapping. In one embodiment, resource manager 282 further contains logic (e.g., access control logic) that permits access by host server 104 to both sensitive resources 270 and non-sensitive resources 280. In one embodiment, resource manager 282 enforces an access and configuration policy received from host server 104, as further described below.

Sensitive resources 270 can include optional key manager 271, optional key(s) store 272, true random number generator 273, optional cryptography engine 274, and memory/storage 277. Optional key manager 271 can manage (e.g., generate, safe keep, and/or destroy) asymmetric key pairs or symmetric keys. Optional key(s) store 272 can store the cryptography asymmetric key pairs or symmetric keys in secure storage within the sensitive resources 270. True random number generator 273 can generate seeds for key generation and cryptographic engine 274 uses, such as authenticating a linked AI accelerator. Optional cryptography engine 274 can encrypt or decrypt key information or data packets for data exchanges. Memory/storage 277 can include storage for AI models 275 and kernels 276. Kernels 276 can include watermark kernel(s) (including inherited watermark kernels watermark-enabled kernels, watermark-signature kernels, et al.), encryption and decryption kernels, and associated data.

AI accelerator 105 can further include non-sensitive resources 290. Non-sensitive resources 290 can include one or more processors or processing logic 291 and memory/storage 292. Processor or processing logic 192 is capable of executing instructions or programs to perform a variety of processing tasks such as AI tasks (e.g., machine-learning processes).

Link configuration module 281 is responsible for establishing or connecting a link or path from an AI accelerator to another AI accelerator, or terminating or disconnecting a link or path from an AI accelerator to another AI accelerator. In one embodiment, in response to a request (e.g., from a host) to join a group of AI accelerators, link configuration module 281 establish a link or path from the corresponding AI accelerator to at least some of the AI accelerators in the group or cluster, such that the AI accelerator can communicate with other AI accelerators, for example, accessing resources of the other AI accelerators for AI processing. Similarly, in response to a request to switch from a first group of AI accelerators to a second group of AI accelerators, link configuration module 281 terminates an existing link of the corresponding AI accelerator from the first group, and establish a new link to the second group of AI accelerators.

In one embodiment, AI accelerator 105 further includes an AI processing unit (not shown), which may include an AI training unit and an AI inference unit. The AI training and inference units may be integrated into a single unit in sensitive resources 270. The AI training module is configured to train an AI model using a set of training data. The AI model to be trained and the training data may be received from host system 104 via communication link 215. In one embodiment, training data can be stored in non-sensitive resources 290. The AI model inference unit can be configured to execute a trained artificial intelligence model on a set of input data (e.g., set of input features) to infer and classify the input data. For example, an image may be input to an AI model to classify whether the image contains a person, a landscape, etc. The trained AI model and the input data may also be received from host system 104 via interface 140 over communication link 215.

In one embodiment, a watermark unit (not shown) in sensitive resources 270 may include a watermark generator, and a watermark inscriber (also termed, "watermark implanter"). Watermark unit (not shown) may include a watermark kernel executor or kernel processor (not shown) of sensitive resources 270 to execute a kernel 276. In an embodiment, a kernel may be received from host 104, or retrieved from persistent or non-persistent storage, and executed in kernel memory 276 in sensitive resources 270 of AI accelerator 105. The watermark generator is configured to generate a watermark using a predetermined watermark algorithm. Alternatively, the watermark generator can inherit a watermark from an existing watermark or extract a watermark from another data structure or data object, such as an artificial intelligence model or a set of input data, which may be received from host system 104. The watermark implanter is configured to inscribe or implant a watermark into a data structure such as an artificial intelligence model or output data generated by an artificial intelligence model. The artificial intelligence model or output data having a watermark implanted therein may be returned from AI accelerator 105 to host system 104 over communication link 215. Note that AI accelerators 105-107 have the identical or similar structures or components and the description concerning an AI accelerator would be applicable to all AI accelerators throughout this application.

Figure 3:
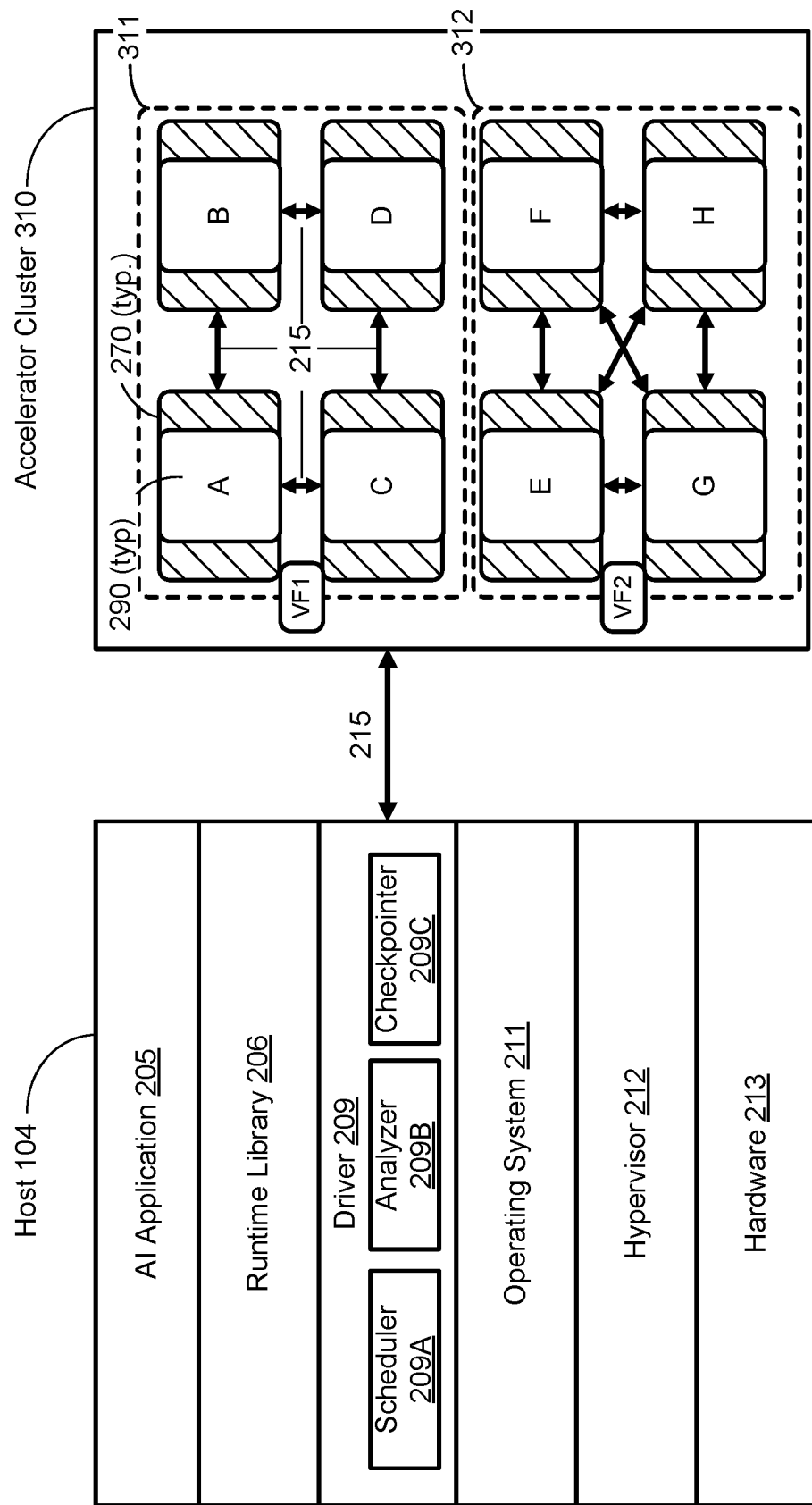
FIG. 3 is a block diagram illustrating a host controlling a cluster of artificial intelligence accelerators, each cluster having a virtual function that maps the resources of a group of AI accelerators within the cluster to a virtual machine, each artificial intelligence accelerator having secure resources and non-secure resources, according to an embodiment.

FIG. 3 is a block diagram illustrating a host 104 controlling a cluster 310 of artificial intelligence accelerators, each cluster having a virtual function that maps the resources of a group 311 of AI accelerators within the cluster to a virtual machine on the host, each artificial intelligence accelerator having secure resources and non-secure resources, according to an embodiment.

Host 104 can include application(s) 205, e.g. artificial intelligence (AI) applications, runtime library 206, one or more drivers 209, an operating system 211, and hardware 213, each of which has been described above with reference to FIGS. 2A and 2B and will not be repeated here. In a virtual computing embodiment, host 104 can further include a hypervisor 212, such as VMware® vSphere/ESXi® or Microsoft® Hyper-V®. Hypervisor 212 can be a type 1 "bare metal" or "native" hypervisor that runs directly on a physical server. In one embodiment, hypervisor 212 can be a type 2 hypervisor that loads inside an operating system 211 like any other application and is managed by the operating system 211. In either case, hypervisor 212 can support one or more virtual machines (not shown) on the host 104. In such an aspect, the virtual machines (not shown) can be treated as the client devices 101 and 102 of FIG. 1.

Artificial intelligence (AI) accelerator cluster 310 can comprise AI accelerators 105-107 described above with reference to FIGS. 2A and 2B. With reference to FIG. 3, AI accelerator cluster 310 can include, e.g., eight (8) AI accelerators labeled A through H. Each AI accelerator in the accelerator cluster 310 can have one or more communication links 215 to one or more other AI accelerators in the accelerator cluster 310. AI accelerator communication links 215 are described above with reference to FIGS. 2A and 2B. Each AI accelerator in the cluster 310 is configured according to a policy received from host 104 driver 209. Each AI accelerator in the cluster 310 can have sensitive resources 270 and non-sensitive 290 resources.

In the example shown in FIG. 3, AI accelerators A-D are configured as a first group 311 of four (4) AI accelerators. The resources of AI accelerators in first group 311 are configured and managed by virtual function VF1 and are associated with a first virtual machine. AI accelerators E-H are configured in a second group 312 of four (4) AI accelerators. The resources of AI accelerators in second group 312 are configured and managed by virtual function VF2 and are associated with a second virtual machine. Resources of the two groups 311 and 312 are mutually exclusive and a user of either of the two groups cannot access resources of the other in the two groups. In the first group 311 of AI accelerators, each AI accelerator has a communication link either directly to another accelerator, e.g. A-B, A-C, B-D, and C-D, or has a communication path to another accelerator via one or more intervening accelerators, e.g. A-B-D, A-C-D, etc. The second group 312 is shown as having direct communication links between each AI accelerators in the second group 312 and each other AI accelerator in the second group 312. Driver 209 can generate a policy wherein each AI accelerator in a group has a direct communication link with each or some of other AI accelerators in the group. In the case of the first group 311, driver 209 can generate a policy that further includes, e.g., instructions for AI accelerator A and D to generate a communication link with one another and AI accelerators B and C to generate a communication link with one another. There can be any number of AI accelerators in a cluster 310, configured into any number of groups.

In a static policy-based embodiment, a single policy which defines the configuration for each of the AI accelerators and is transmitted from the driver 209 to the all AI accelerators in the cluster 310. In an embodiment, the driver 209 can transmit the policy in a single broadcast message to all AI accelerators in the cluster. Each AI accelerator reads the policy and makes (link up) or breaks (link down) a communication link with one or more AI accelerators in the cluster 310, thereby configuring the AI accelerators into one or more groups. In FIG. 3, there are eight (8) AI accelerators configured as a two groups of four (4) AI accelerators. Each AI accelerator in a group has either a direct communication link to each AI accelerator in the group or has an indirect communication path to each AI accelerator in the group via one or more AI accelerators to which the AI accelerator has a direct communication link. In the static policy-based environment, scheduler 209A of driver 209 can schedule processing tasks on one or more groups of the cluster 310 using time-slicing between applications 205 and/or users of virtual machines. In an embodiment, each group of accelerators in the accelerator cluster 310 can have a distinct and separate scheduler 209A. The static policy can be changed by the driver 209 generating a new policy that describes configuration for each of the AI accelerators in cluster 310.

Each AI accelerator (e.g., link configuration module 281 and/or resource manager 282) in the cluster 310 reconfigures itself in accordance with the policy, making (link up) or breaking (link down) communication links between the AI accelerator and one or more other AI accelerators in the cluster 310. Static policy-based configuration is fast in that the configuration is transmitted in a single, e.g. broadcast, message, and each AI accelerator configures itself substantially in parallel with other AI accelerators in the cluster 310. Since the policy for all AI accelerators is transmitted to all AI accelerators at a same time, configuration can occur very quickly. For example, if the policy includes instructions to AI accelerator "A" to generate a link AI accelerator "B", then the policy also has instructions that AI accelerator B is to generate a link to AI accelerator A. Each AI accelerator can open their own end of a link substantially simultaneously thereby opening the link between AI accelerator A and AI accelerator B very quickly. In one embodiment, the single policy can be expressed as an adjacency table of AI accelerators.

Static policy-based configuration is also efficient in that it supports time-slice scheduling between different users and supports allocating processing tasks of a user to more than one AI accelerator group in the cluster 310. The static policy can be generated from the analyzer 209B determining characteristics of the processing tasks in the scheduler 209A. For example, scheduler 209A may include a large number of tasks that use a same AI model to perform inferences or further train the AI model. Analyzer can generate a policy that configures a number of AI accelerators to prepare for performing inferences or training on the AI model. Configuration can include identifying a grouping of AI accelerators, and loading one or more AI models into sensitive memory of one or more of the AI accelerators in preparation for the processing tasks in the scheduler 209A.

In a dynamic policy-based embodiment, driver 209 can individually configure each AI accelerator in the cluster 310 to achieve configuration of the AI accelerators. A policy is transmitted separately to each AI accelerator. In practice, in dynamic policy based embodiment, the policies transmitted to each AI accelerator typically differ from one another. The AI accelerator receives the policy and configures itself in accordance with the policy. Configuration includes an AI accelerator configuring itself into, or out of, a group in the cluster 310. An AI accelerator configures itself into a group by making a communication link (link up) with at least one AI accelerator in the group, in accordance with the policy. An AI accelerator leaves a group by breaking a communication link (link down) between the AI accelerator and all AI accelerators in the group. After configuration, if an AI accelerator is not a member of any group of AI accelerators, the AI accelerator can be set to a low-power model to reduce heat and conserve energy. In one embodiment, scheduler 209A assigns an AI accelerator or AI accelerator group to each user or application for which scheduler 209A is scheduling processing tasks to the cluster 310.

Figure 4A:
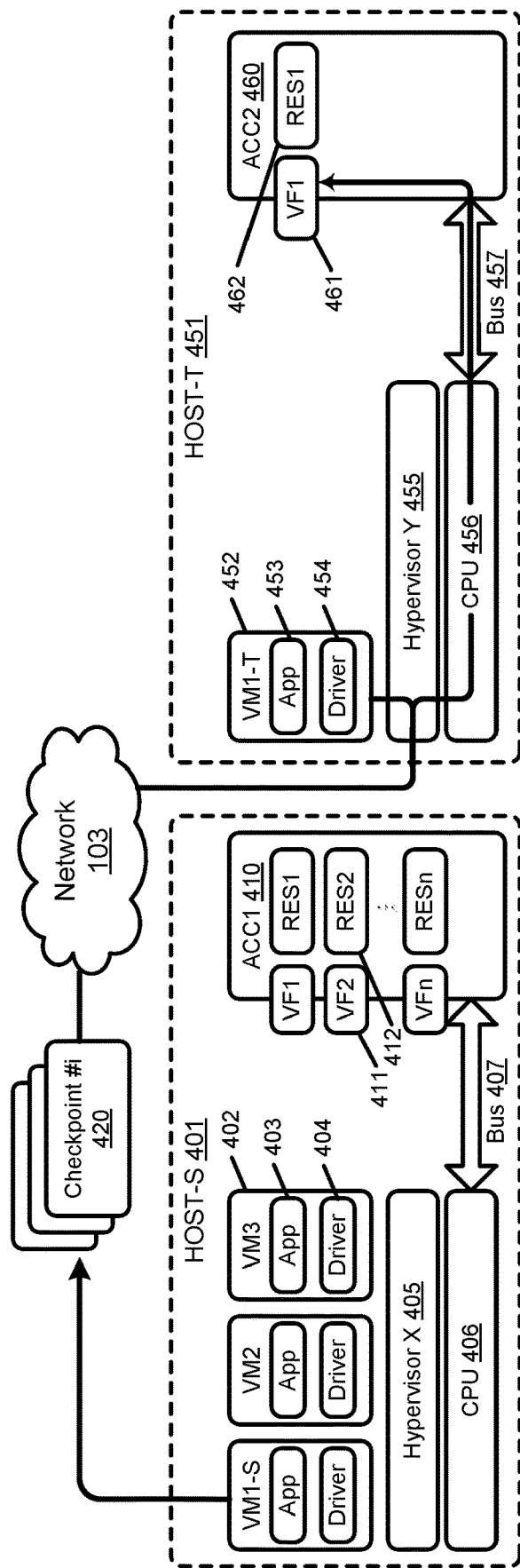
FIG. 4A is a block diagram illustrating components of a data processing system having artificial intelligence (AI) accelerators to implement a method for virtual machine migration with checkpoint authentication in a virtualized environment, according to an embodiment.

FIG. 4A is a block diagram illustrating components of a data processing system having artificial intelligence (AI) accelerators to implement a method for virtual machine migration with checkpoint authentication in a virtualized environment, according to an embodiment.

A source host (HOST-S) 401 can support a plurality of virtual machines (VM's) such as a first (source) VM to be migrated (VM1-S) to a target host (HOST-T) 451, via network 103. Network 103 can be any network, as described with reference to FIG. 1, above. HOST-S 401 can also support additional VM's, such as VM2 and VM3. Virtual machines VM1-S, VM2, and VM3 (each labeled "402") can each include at least one application 403 and at least one driver 404. Driver 404 can include one or more function libraries and application programming interfaces (API's) that enable the VM 402 containing the driver 404 to communicate with one or more artificial intelligence (AI) accelerators 410 that are communicatively coupled with the VM 402 via hypervisor 405, CPU 406, and bus 407.

Hypervisor X 405 can be any type of hypervisor, including a "bare metal" hypervisor running on HOST-S 401's hardware, or the hypervisor can run an operating system (not shown) of the HOST-S 401 executing on the host's hardware, such as CPU 406 and memory (not shown). CPU 406 can be any type of CPU, such general purpose processor, a multi-core processor, a pipelined processor, a parallel processor, and the like. Bus 407 can be any type of high-speed bus such as peripheral component interconnect express (PCIe), a fiber-optic bus, or other type of high-speed bus. As described above with reference to FIGS. 2A, 2B, and 3, communication channel 215, the communication over bus 407 can be encrypted. Bus 407 communicatively couples CPU 406 to the one or more artificial intelligence (AI) accelerators 410. Each VM can have a separately encrypted communication channel 215 that uses one or more different keys that the encrypted communication channel 215 of each of the other VMs.

Each AI accelerator 410 can host one or more virtual functions, such as VF1, VF2, VFn, each labeled with reference 411 in FIG. 4. A virtual function 411 maps resources 412, e.g. RES1, RES2, . . . RESn of accelerators ACC1 410 to a particular host virtual machine 402. Each virtual machine 402 has a user. A virtual function 411 associated with a particular VM 402 (e.g. VM1-S) can only be accessed by the user of the particular VM 402 (e.g. VM1-S). Virtual machine resources are each labeled with reference 412 in FIG. 4. Virtual machine resources 412 are described above with reference to FIG. 2B, and include such resources as non-sensitive resources 290 (including processing login 291 and memory/storage 292), an accelerator channel manage 280 (including link configuration 281 and resource manager 282), and sensitive resources 270 (including AI model(s) 275, kernel(s) 276, in memory/storage 277, and key manger 271, key(s) store 272, true random number generator 273, and cryptographic engine 274. As described more fully below, after a virtual machine, e.g. VM1-S is migrated to a target host, e.g. HOST-T 451, at least the sensitive resources should be erased so that after the migrated virtual function of VM1-S is migrated to the target host HOST-T 451, and the now-unused resources of the migrated virtual function of VM1-S are assigned to a new VM, that the sensitive data of the migrated VM1-S and the sensitive data associated with the virtual function associated with the VM1-S will not be accessible to the new VM.

A target host, e.g. HOST-T 451, can be of a same or similar hardware and software configuration as HOST-S 401. Accelerators 410 and accelerators 460 should be of a same or similar type, such as having a compatible instruction set for their respective processors. The HOST-T 451 should have, quantitatively, sufficient resources available as may be required by VM-S so that VM1-S may be migrated to VM1-T. Qualitatively, HOST-S 401 and HOST T-451 should have compatible operating hardware and software. For example, HOST-S 401 accelerators 410 may be of a same manufacturer, and a compatible model, as the accelerators ACC2 460 on HOST-T 451, else the migration may not be successful.

Checkpoint 420 is a snapshot of a state of VM1-S, up to and including the virtual function 411 (e.g. VF1) that is being migrated as a part of the migration of VM1-S from HOST-S 401 to HOST-T 451. The checkpoint of VM1-S, and associated virtual function, can include the following information. In an embodiment, the checkpoint does not include information contained within the resources 412 inside the accelerator 410. The following list of information that is included in a checkpoint is by way of illustration, not limitation. One of skill in the art could add to, or delete from, the following table of information for a checkpoint 420 of a virtual machine and virtual function to be migrated.

Exemplary Contents of a Checkpoint Frame 420

| Subsystem | Resource | Checkpoint Data |
|---|---|---|
| Driver 209 | Scheduler 209 | Date and time stamp<br>Virtual machine identifier<br>List of scheduled AI tasks for AI accelerator(s) |
| Oper. System 211 | Scheduler (not shown) | Pending tasks of AI application 205 |
| Cluster 310 | AI Accelerators 105 | Number and type (mfr./model) allocated |
| Cluster 310 | AI Accelerators 105 | Comm. config. 215 of allocated accelerators |
| Sensitive 270 | Memory/storage 277 | Memory type (static, dynamic), amount, address |
| Sensitive 270 | Key generation 271 | Enabled? |
| Sensitive 270 | Key store 272 | No. and use for keys, key type (symm/asymm). |
| Sensitive 270 | Rand. No. Gen. 273 | Enabled? |
| Sensitive 270 | Crypto-engine 274 | Digest, signature, encrypt, decrypt enabled? |
| Non-sensitive 290 | Processor(s) | Number of cores, clock speed, priority, slices |
| Non-sensitive 290 | Memory | Memory type (static, dynamic), amount, address |

Figure 6:
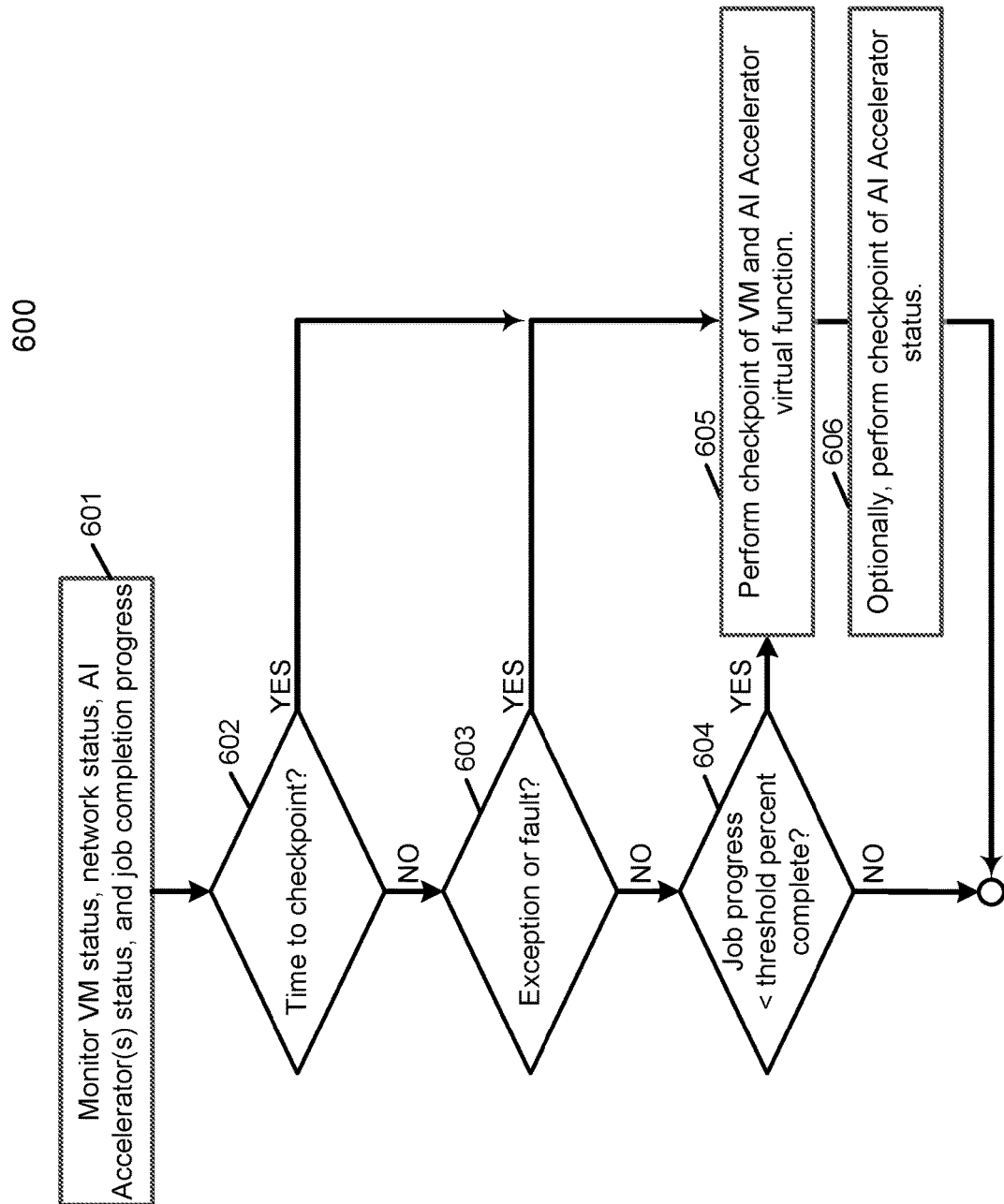
FIG. 6 illustrates a method of generating a checkpoint for use in a method for virtual machine migration with checkpoint authentication in a virtualized environment, from the perspective of the source hypervisor on the host of the virtual machine to be migrated, according to an embodiment.

Checkpointer 209C can generate a checkpoint frame 420 according to events described in FIG. 6. Checkpoint frame 420 may be generated, e.g., at a specified increment of time, upon detection of system exception or fault, or upon receipt of an instruction to take a checkpoint frame 420. Such an instruction may come from a user, such as an administrator or end-user. Each checkpoint frame 420 may be on the order of, e.g., 1 gigabyte (GB) in size. In an embodiment, checkpointer 209 may include a circular buffer that stores up to a specified number, k, checkpoint frames 420. When the buffer is full, a next added frame overwrites the oldest checkpoint frame 420. When it is time to migrate the virtual machine and virtual function, a user may select a particular checkpoint frame 420 to use to perform the migration, representing a known state of the running application 403 that the user prefers for the migration. In embodiment, a migration uses the most recent checkpoint frame 420 by default. In an embodiment, the checkpoint frame 420, a hash of the checkpoint frame 420, and a date and time stamp of the checkpoint frame 420 can be digitally signed before transmitting the checkpoint frame 420 from the source VM1-S to a hypervisor of a target host HOST-T 451 during a migration of the source VM1-S.

When the hypervisor 455 of the target host HOST-T 451 receives the checkpoint frame 420, the hypervisor 455 can decrypt the checkpoint frame 420 using a public key of the VM1-S, validate that the date and time stamp falls within a predetermined window of time, and verify the hash of the checkpoint frame. Verifying the date and time stamp validates a freshness of the checkpoint frame 420. If the hypervisor 455 of the target HOST-T 451 validates the checkpoint frame 420, then the hypervisor 455 of HOST-T 451 can allocate resources for the source VM1-S at HOST-T 451 to generate VM1-T 452.

Figure 4B:
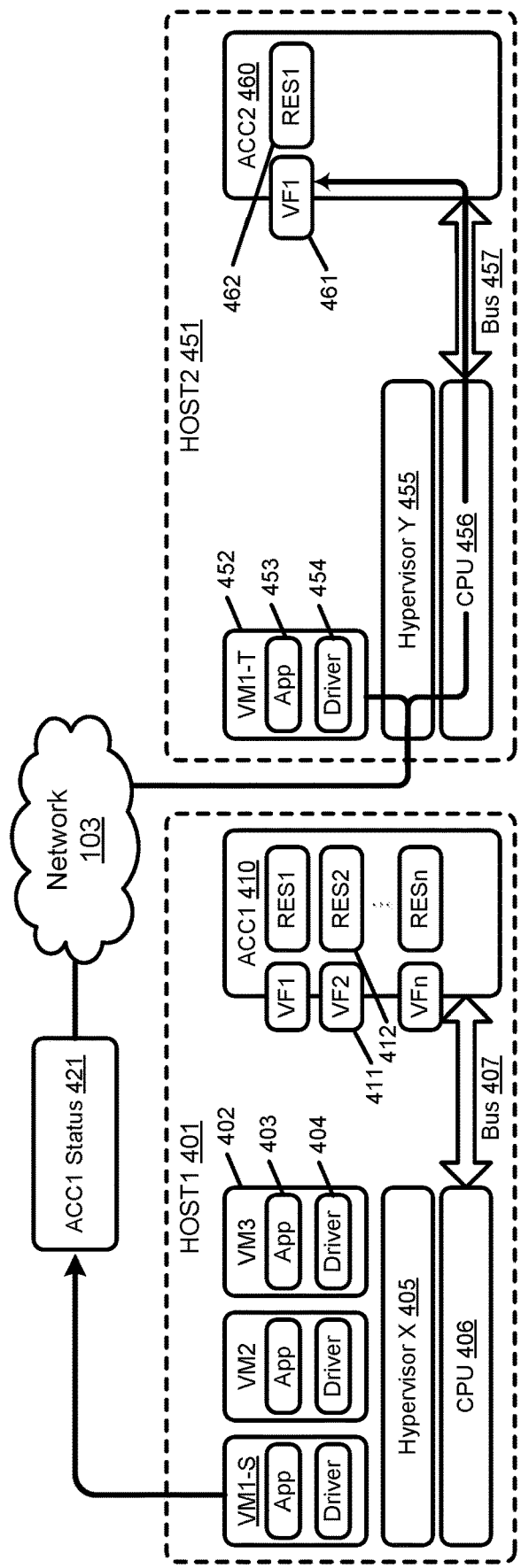
FIG. 4B is a block diagram illustrating components of a data processing system having artificial intelligence (AI) accelerators to implement a method for virtual machine migration with AI accelerator status validation in a virtualized environment, according to an embodiment.

Referring now to FIG. 4B, checkpointer 209 can further obtain an AI accelerator status frame 421. An AI accelerator status frame 421 differs from a checkpoint frame 420 in that the AI accelerator status frame 421 captures information inside the AI accelerator(s) 410. Captured content of an AI accelerator status frame can include contents of one or more registers inside the AI accelerator, contents of secure memory and non-secure memory containing, e.g. AI models, kernels, intermediate inference calculations, and the like. The AI accelerator status frame 421 may be taken synchronously with a checkpoint frame 420, so that information obtained AI accelerator status frame 421 is "fresh" (current) with respect to the most recent checkpoint frame 420 of the VM1-S to be migrated, and its associated virtual function that maps allocation of AI accelerator 410 resources to a virtual machine, e.g. VM1-S. In an embodiment, the AI accelerator status frame 421 can be taken after a checkpoint frame 420, and after pending AI tasks of the executing application 403 have been stopped. Such an embodiment avoids the AI accelerator status frame 421 storing a status of the AI accelerator that corresponds to partial, in-progress processes or threads that may be difficult to reliably restart after migration.

An AI accelerator status frame 421 can contain the following information. The following information is by way of example and not limitation. One of skill in the art could add to, or delete from, the information in the table for a particular system installation. The AI accelerator status frame 421, a hash of the frame, and a data and time stamp of the frame, can be digitally signed with a private key of the AI accelerator 410, or a private key of the virtual machine VM1-S before transmitting the frame to a hypervisor 455 of a target host HOST-T 451 during a migration of the VM1-S. When it is time to migrate the virtual machine VM1-S and virtual function, a user may select a particular AI accelerator status frame 421, or the frame 421 may be generated in response to a selection of a checkpoint frame 420 and in response to receiving an instruction to migrate the source VM1-S to the target HOST-T 451. In embodiment, a migration uses the AI accelerator status frame 421 associated with most recent checkpoint frame 420 by default. In an embodiment, the AI accelerator status frame 421, a hash of the AI accelerator status frame 421, and a date and time stamp of the AI accelerator status frame 421 can be digitally signed before transmitting the AI accelerator status frame 421 from the source VM1-S to a hypervisor 455 of a target host HOST-T 451 during a migration of the source VM1-S.

When the hypervisor 455 of the target host receives the AI accelerator status frame 421, the hypervisor can decrypt the AI accelerator status frame 421 using a public key of the VM1-S, or, in an embodiment, a public key of the AI accelerator 410 of VM1-S to validate that the date and time stamp falls within a predetermined window of time, and verify the hash of the AI accelerator status frame 421. The check on the date and time stamp validates a freshness of the AI accelerator status frame 421. If the hypervisor 455 of the target HOST-T 451 validates the AI accelerator status frame 421, then the hypervisor 455 of HOST-T 451 can copy in the contents of the AI accelerator status frame to the AI accelerator ACC2 460 on VM1-T 452.

| Exemplary AI Accelerator Status Frame 421 | | |
|---|---|---|
| Subsystem | Resource | AI Accelerator Status |
| Channel Mgr. 280 | Link. Config. 281 | Data and time of frame Hash of frame Configuration of links to other accelerators |
| Sensitive 270 | Memory/storage 277 | Checkpoint memory content (AI models/kernels) |
| Sensitive 270 | Key generation 271 | Is key generation enabled? |
| Sensitive 270 | Key store 272 | Checkpoint the keys in the keystore |
| Sensitive 270 | Random no. gen. 273 | Is random number generator enabled? |
| Sensitive 270 | Crypto-engine 274 | Is cryptographic engine enabled? |
| Non-sensitive 290 | Processor(s) 291 | Number of cores, clock speed, priority, slices |
| Non-sensitive 290 | Processor(s) 291 | Checkpoint of processor cache/pipeline |
| Non-sensitive 290 | Memory 292 | Checkpoint non-sensitive memory contents |

Figure 5A:
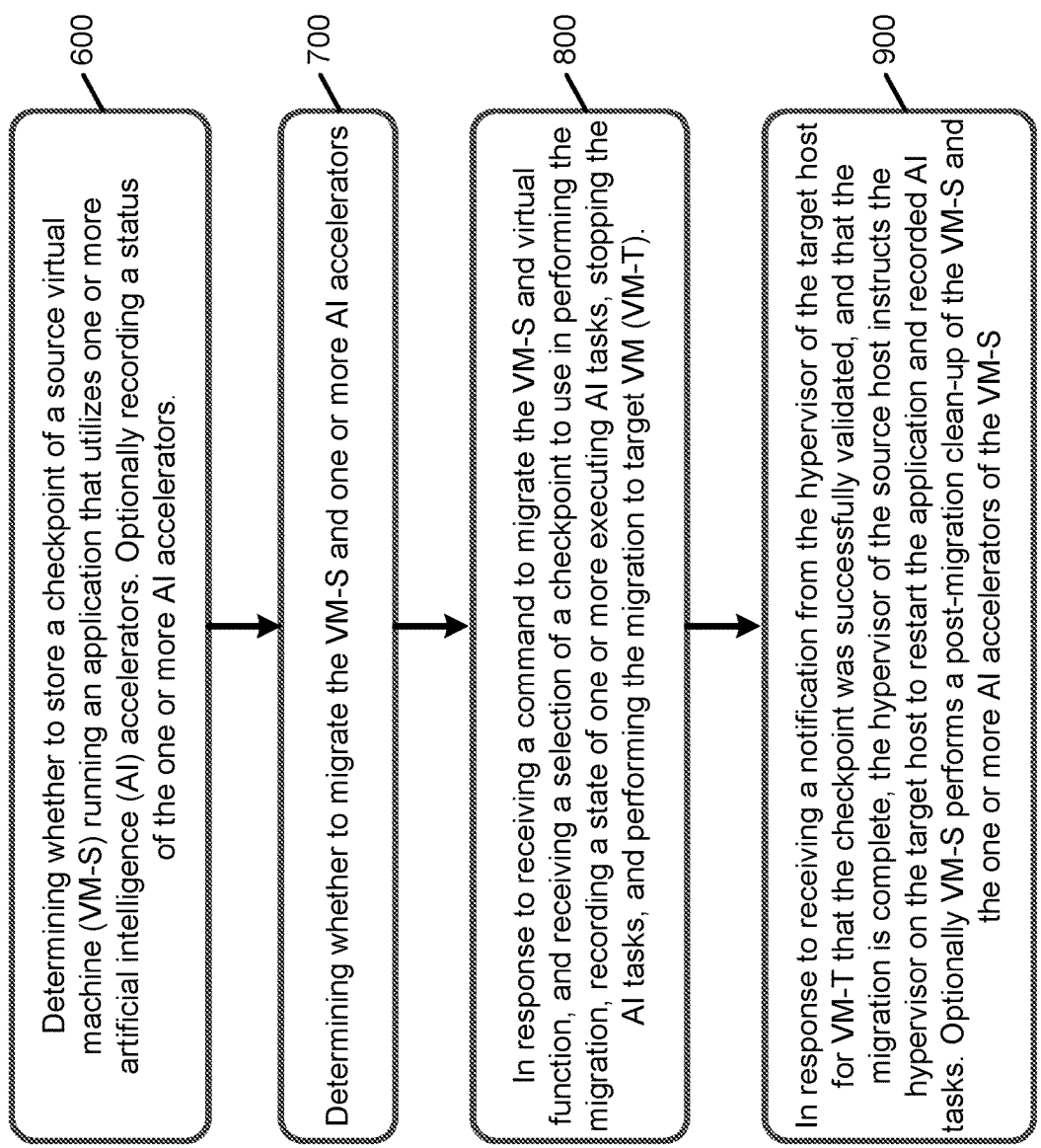
FIG. 5A illustrates a method for virtual machine migration of a data processing system having AI accelerators with checkpoint authentication in a virtualized environment, from the perspective of the hypervisor of a host of a source virtual machine to be migrated, according to an embodiment.

FIG. 5A illustrates a method 500 for virtual machine migration of a data processing system having AI accelerators using checkpoint authentication in a virtualized environment, from the perspective of the source hypervisor that hosts the virtual machine to be migrated, according to an embodiment. Method 500 can be practiced on a source virtual machine, e.g. VM1-S, to be migrated to a target host, e.g. HOST-T 451 as migrated virtual machine VM1-T.

In operation 600, logic of VM1-S can determined whether to store a checkpoint frame 420 of the VM1-S that is running an application 403 that utilizes one or more artificial intelligence (AI) accelerators, e.g. ACC1 410. The checkpoint frame 420 contains a snapshot of VM1-S, including the application 403, threads executing of the application, a scheduler 209A containing the executing threads, memory allocated by the VM1-S related to the application, and a virtual function that maps the resources of one or more AI accelerators to the VM1-S, as described above with reference to FIG. 4A. In an embodiment, optionally, generating the checkpoint frame 420 can also trigger taking an AI accelerator status frame 421. In an embodiment, the AI accelerator status frame 421 can be generated and stored after one or more AI tasks associated with the application 403 have been paused or stopped in operation 800, below. Operation 600 is described in detail below, with reference to FIG. 6.

In operation 700, the VM1-S can determine whether to migrate the VM1-S. The decision can be based upon receipt of a user command, such as from an administrator or an end-user. In an embodiment, the decision to migrate VM1-S can be based upon an exception or fault threshold being above a threshold value. Operation 700 is described in detail below with reference to FIG. 7.

In operation 800, in response to receiving a command to migrate the VM1-S, application, and virtual function for the associated AI accelerators to a target host 451, and in response to receiving a selection of a checkpoint frame 420 to use in performing the migration, checkpointer 209C records a state of one or more executing AI tasks related to the running application, then stops or pauses the one or more executing AI tasks. VM1-S then begins a process 800 for migrating the VM1-S and virtual function to the target host. Operation 800 is described below with reference to FIG. 8.

In operation 900, in response to the VM1-S receiving a notification from a hypervisor 455 of the target host 451 that the hypervisor 455 has successfully validated the checkpoint 420, and that the migration is complete, the hypervisor of the source host instructs the hypervisor 455 on target host 451 to restart the migrated application and the recorded tasks in VM1-T. Optionally, VM1-S performs a post-migration clean-up of the VM1-S and the one more AI accelerators associated with the VM1-S through the virtual function. Method 900 is described below with reference to FIG. 9. Method 500 ends.

Figure 5B:
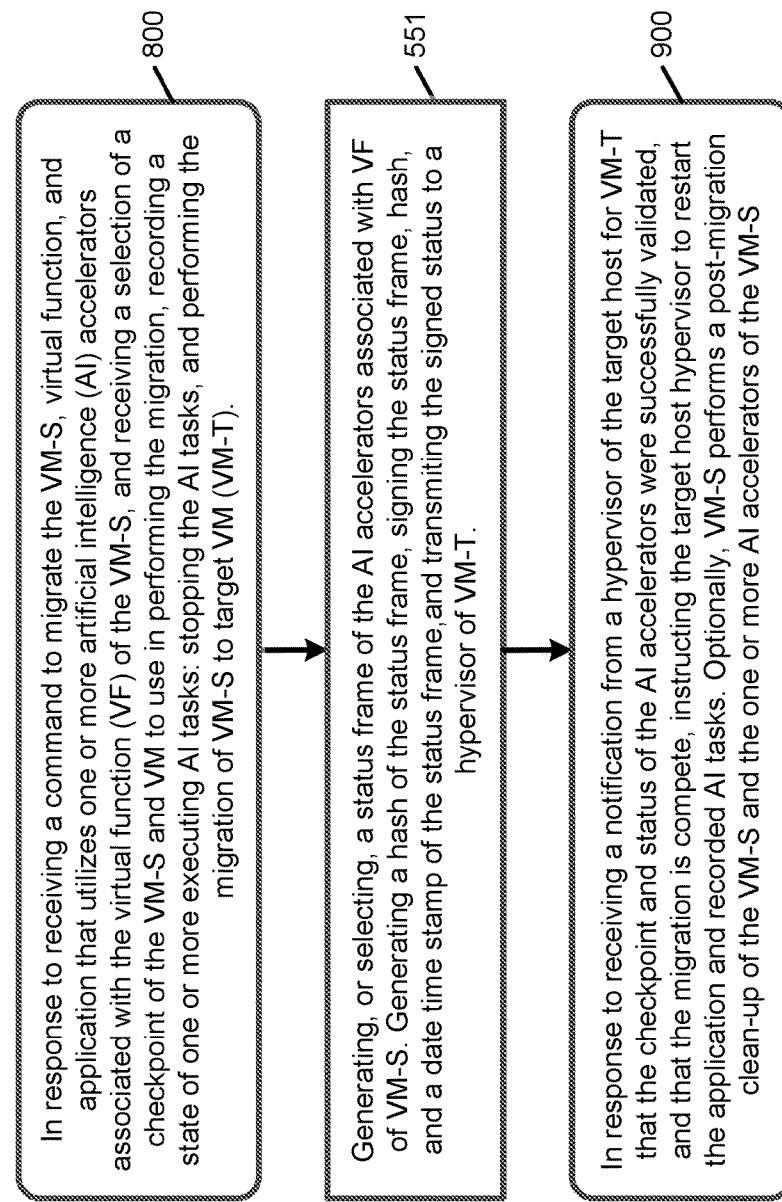
FIG. 5B illustrates a method for virtual machine migration of a data processing system having AI accelerators using AI accelerator status validation in a virtualized environment, from the perspective of a hypervisor of a host of a source virtual machine to be migrated, according to an embodiment.

FIG. 5B illustrates a method 550 for virtual machine migration on a data processing system having AI accelerators using AI accelerator status validation in a virtualized environment, from the perspective of the source hypervisor that hosts the source virtual machine to be migrated, according to an embodiment. Method 550 can be practiced on a source virtual machine, e.g. VM1-S, to be migrated to a target host, e.g. HOST2 451, as migrated virtual machine VM1-T.

In operation 800, in response to receiving a command to migrate the VM1-S, an application running on VM1-S, and virtual function for the associated AI accelerators, to a target host 451, and in response to receiving a selection of a checkpoint frame 420 to use in performing the migration, checkpointer 209C records a state of one or more executing AI tasks related to the running application, then stops or pauses the one or more executing AI tasks. VM1-S then begins a process 800 for migrating the VM1-S and virtual function to the target host. Operation 800 is described below with reference to FIG. 8.

In operation 551, after the checkpoint frame 420 is selected, then VM1-S generates, or selects, a status frame of the AI accelerators 421 associated with the virtual function of VM1-S. The AI accelerator status frame 421 is described above with reference to FIG. 4B. A hash of the AI accelerator status frame 421 is generated, a data and time stamp of the AI accelerator status frame 421 is generated, and the AI accelerator status frame 421, hash, and date and time stamp are digitally signed with a private key of the VM1-S, or, in an embodiment, a private key of the AI accelerator 410 associated with the virtual function that maps AI resources to the VM1-S. The digitally signed AI accelerator status frame 421 is transmitted to the hypervisor 455 of the target host 451.

In operation 900, in response to receiving a notification from the hypervisor 455 of the target host 451 that the checkpoint frame 420 and AI accelerator status frame 421 were successfully validated, and that the migration is complete, the hypervisor 455 on the target host 541 restarts the application and the recorded AI tasks within the migrated virtual machine VM1-T. Optionally, VM1-S can perform a post-migration clean-up. Operation 900, including the post-migration clean-up of the VM1-S and the one or more AI accelerators associated with the VM1-S through the virtual function, is described below in detail with reference to FIG. 9. Method 550 ends.

FIG. 6 illustrates a method 600 of generating a checkpoint frame for use in a method for virtual machine migration with checkpoint authentication in a virtualized environment, from the perspective of the source hypervisor that hosts the virtual machine to be migrated, according to an embodiment.

In operation 601, hypervisor 405 in host 401 monitors a source virtual machine's (e.g. VM1-S) states, network status, AI accelerator status, and job completion progress.

In operation 602, it is determined whether a time increment for generating a checkpoint frame 420 has expired. The time increment can be set by a user or an administrator and may be dynamically adjusted based upon conditions. In an embodiment, a user adjusts the time increment, such as in anticipation of a need to migrate VM1-S, such as if an application running on VM1-S is not making sufficient progress, or other reason. In an embodiment, a time increment is fixed. In an embodiment, the time increment is increased or decreased dynamically with respect to a frequency of faults, or lack of faults such that checkpoint frames 420 are generated more frequently if faults are increasing, or less frequently if faults are decreasing. If it is time to generate a checkpoint frame 420, then method 600 continues at operation 605, otherwise method 600 continues at operation 603.

In operation 603, it is determined whether an exception or fault has occurred. A fault counter can be configured one or more types of different of faults having differing significance. A processor exception be far more significant than, e.g., a network fault in a network that supports retries of failed sends or receives. Thus a processor fault may trigger generation of a checkpoint frame 420 at a lower count than network fault counts. If an exception or fault occurs above a configured fault count for the exception or fault type, then method 600 continues at operation 605, otherwise method 600 continues at operation 604.

In operation 604, it is determined whether job progress is less than a threshold progress percent of completion. In an embodiment, a job progress can have multiple types of job progress counters. Each job progress counter type can be, e.g., triggered by invocation of a particular piece of source code, or a by a call to a particular AI functionality within an AI accelerator, such as a job progress counter for training an AI model or a counter for an AI inference. The counter can be based on expected execution time vs. actual execution time, or other measure. If a job progress counter indicates that progress is less than a threshold percent for the progress counter type, then method 600 continues at operation 605 otherwise method 600 ends.

In operation 605, VM1-S generates a checkpoint frame 420 of VM1-S, the running application, and the virtual function that maps AI accelerator resources to the VM1-S.

In operation 606, optionally, an AI accelerator status frame 421 can be generated after the checkpoint frame 420 is generated. Method 600 ends.

Figure 7:
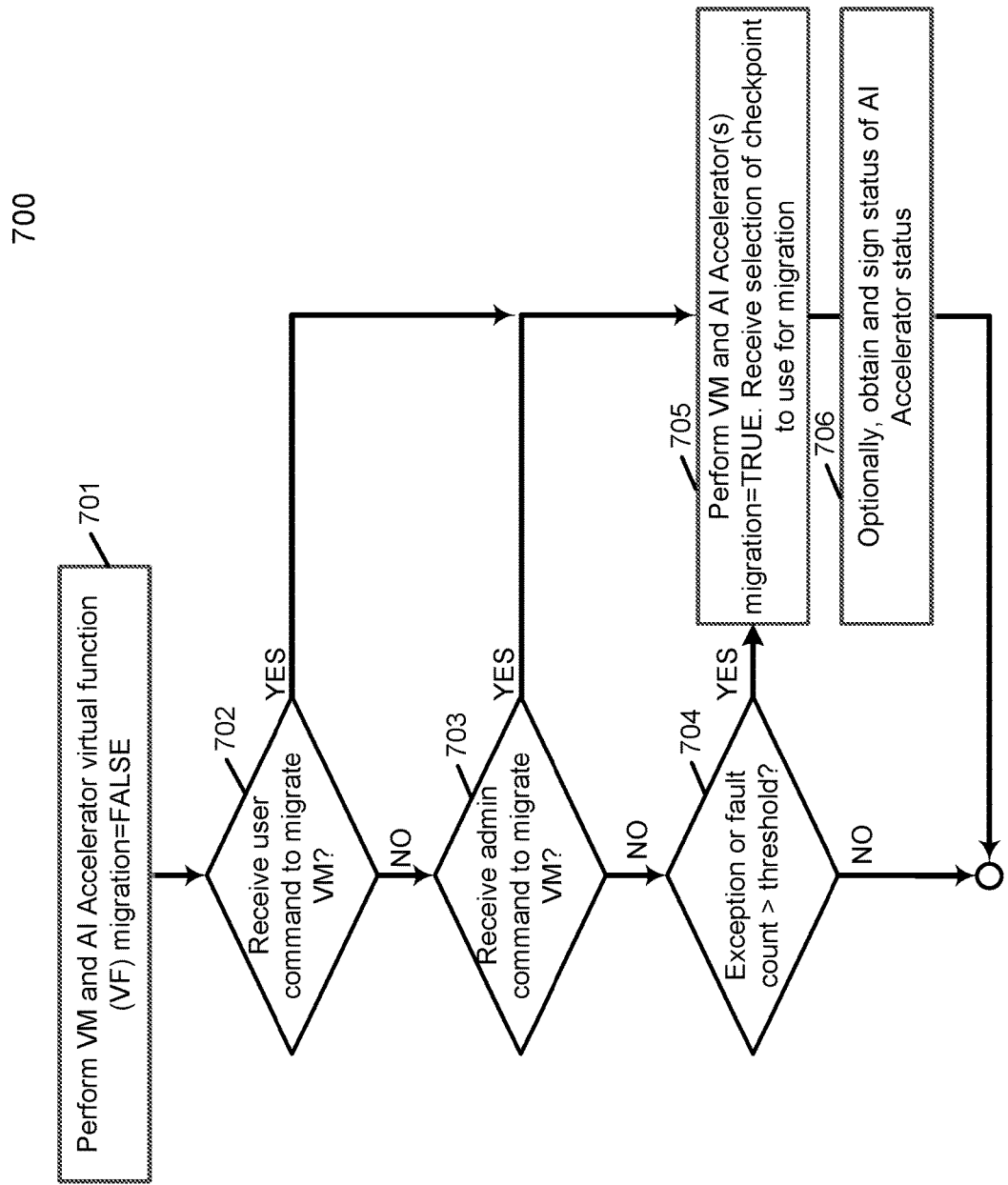
FIG. 7 illustrates a method of determining whether to a migrate virtual machine of a data processing system having AI accelerators with checkpoint authentication in a virtualized environment, from the perspective of the source hypervisor that hosts the virtual machine to be migrated, according to an embodiment.

FIG. 7 illustrates a method 700 of determining whether to migrate virtual machine of a data processing system having AI accelerators with checkpoint authentication, and/or AI accelerator status validation, in a virtualized environment, from the perspective of the source hypervisor that hosts the virtual machine to be migrated, according to an embodiment.

In operation 701, a flag indicating whether to migrate the virtual machine (VM) is set to false.

In operation 702, it is determined whether VM logic has received a user command to migrate the VM. In an embodiment, the command to migrate can originate from a user of the VM that may be monitoring the progress of an executing AI application. Reasons that a user may elect to migrate a VM can be as are known in the art: e.g. that a process is not making sufficient progress as might be expected, that a particular host machine is heavily loaded or has limited resources, and is contributing to the lack of progress, and the like. If a user command is received to migrate the VM, method 700 continues at operation 705, otherwise method 700 continues at operation 703.

In operation 703, it can be determined whether command to migrate a VM has been received from an administrator. An administrator may regularly monitor loads on servers, progress of one or more applications, and available resource levels. An administrator may elect to send a migrate command in response to a user request, or on the administrator's own judgment. If an administrator issued a command to migrate the VM, then method 700 continues at operation 705, otherwise method 700 continues at operation 704.

In operation 704, it can be determined whether a count of a type of exception or fault has exceeded a threshold amount. There can be a different threshold for different types of faults. For example, a count of processor exceptions may be very low, and count of network faults may be—by comparison to processor faults—much higher before an automatic migration is triggered based upon fault counts. In an embodiment, instead of automatically initiating a migration of the VM based on automatically detected conditions, a notification may be sent to an administrator advising that the VM be migrated based upon detected faults. If any type of fault or exception occurs more times that a threshold value associated with that fault or exception type, then method 700 continues at operation 705 otherwise method 700 ends.

In operation 705, the migration flag is set to true. A selection of a checkpoint to use for migration is also received. In the case of a user command or administrator command to initiate the migration, the command may also include the checkpoint frame 420 to use for the migration. In the case of an automatically initiated migration command, a checkpoint frame 420 may be automatically generated, or the most recent checkpoint frame 420 can be selected. In an embodiment, a new checkpoint frame 420 is generated if the most recent stored checkpoint frame 420 is older than a threshold amount of time.

In operation 706, optionally, an AI accelerator status frame 421 can be generated. In the case of a migration command that was automatically generated, based upon fault conditions, an AI accelerator status frame 421 may be automatically generated and can be used with the migration. If an AI accelerator status frame is either selected or generated, then method 550 (FIG. 5B) can be performed. Otherwise, method 500 (FIG. 5A) is performed. Method 700 ends.

Figure 8:
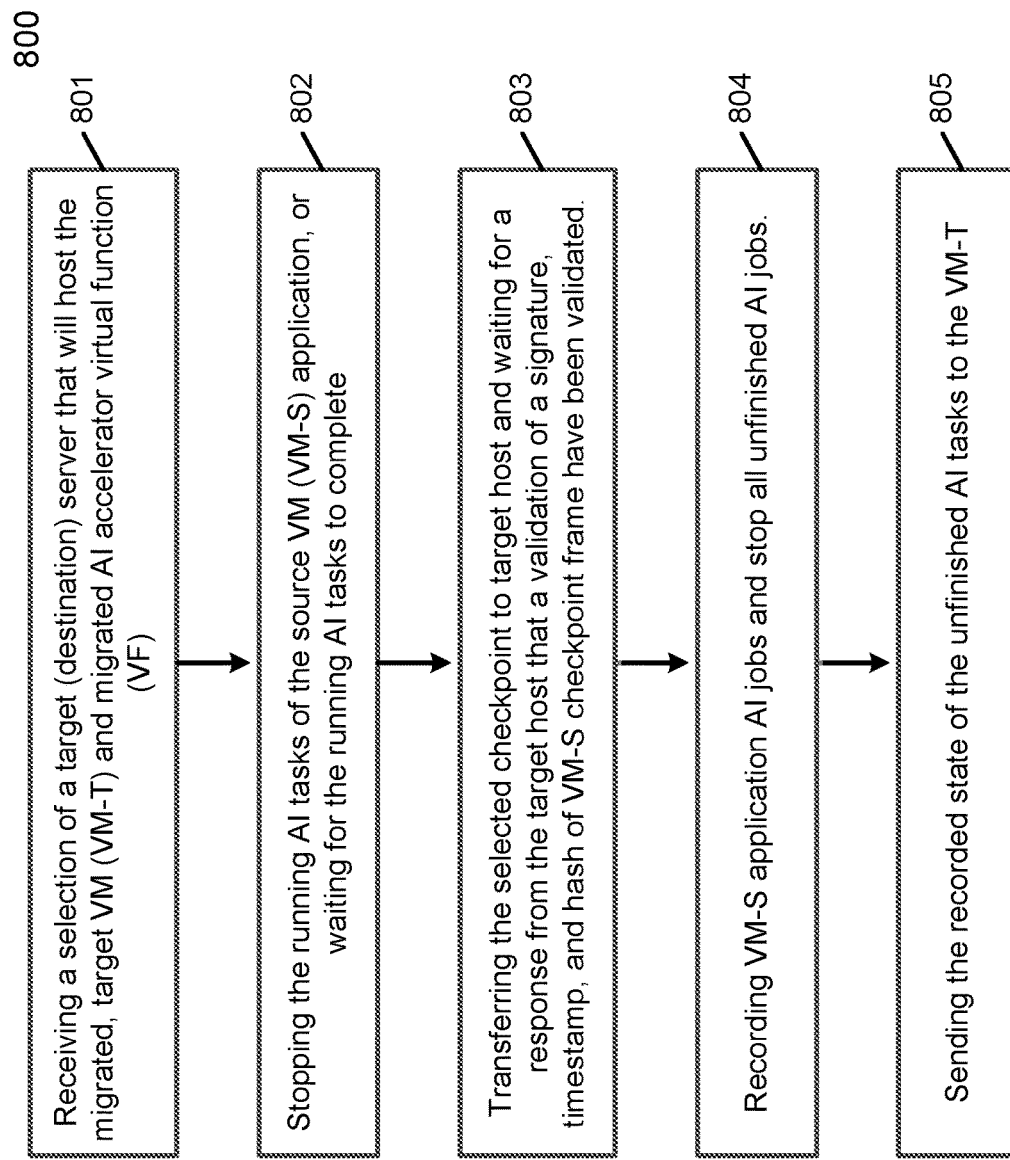
FIG. 8 illustrates a method of migrating a virtual machine of a data processing system having AI accelerators with checkpoint authentication in a virtualized environment, from the perspective of the source hypervisor that hosts the virtual machine to be migrated, according to an embodiment.

FIG. 8 illustrates a method 800 of migrating a virtual machine of a data processing system having AI accelerators with checkpoint authentication in a virtualized environment, from the perspective of the source hypervisor that hosts the virtual machine to be migrated, according to an embodiment.

In operation 801, a selection of a target (destination) server, e.g. host 451, is received that will host the migrating virtual machine, e.g. VM1-S.

In operation 802, one or more running AI tasks of the running application on the VM1-S are stopped or paused. In an embodiment, one or more of the running AI tasks are allowed to finish, and others are paused or stopped.

In operation 803, a selected checkpoint frame 420 is transferred to the target host 451. The hypervisor 405 of VM1-S waits from a response from the target host that a validation of the signature, date and time stamp, and hash of the checkpoint frame 420 has been validated.

In operation 804, hypervisor 405 or driver 209 records the AI application running on the VM1-S, and any associated unfinished AI tasks, and all unfinished AI tasks are stopped.

In operation 805, VM1-S hypervisor 405 sends the recorded state of the unfinished AI jobs to the hypervisor 455 of the target host 451. Method 800 ends.

Figure 9:
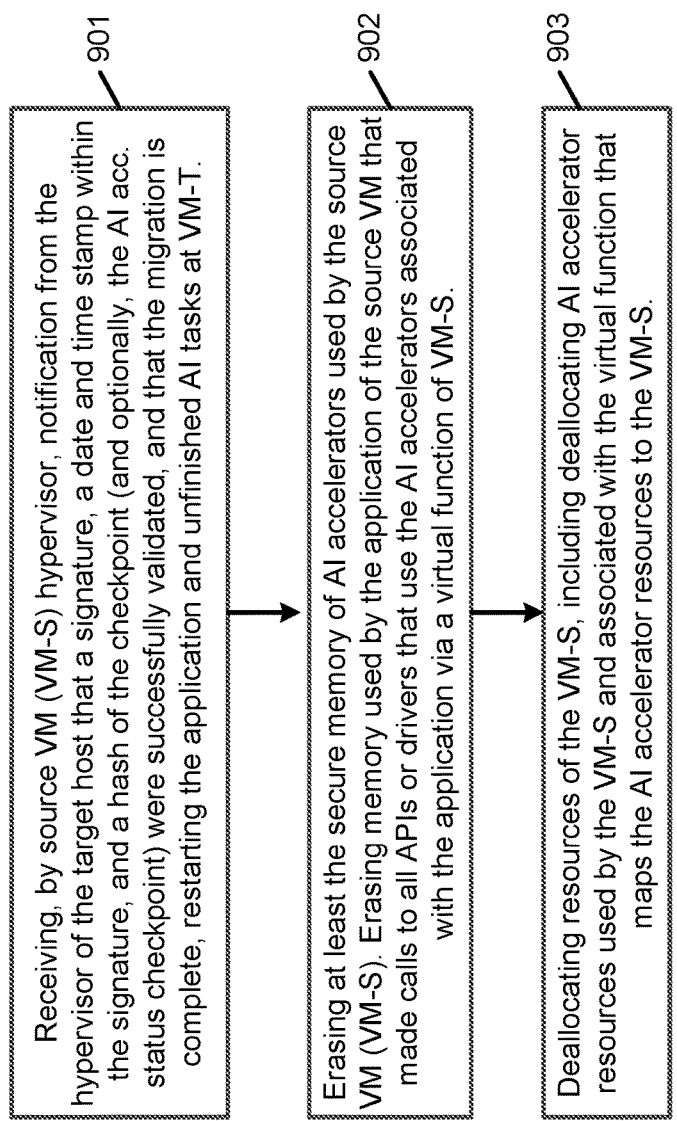
FIG. 9 illustrates a method of performing post-migration clean-up of a source host computing device after migrating a virtual machine of a data processing system having AI accelerators with checkpoint authentication in a virtualized environment, according to an embodiment.

FIG. 9 illustrates a method 900 of performing post-migration clean-up of a source virtual machine after migrating the virtual machine of a data processing system having AI accelerators with checkpoint authentication in a virtualized environment, according to an embodiment.

In operation 901, the hypervisor 405 of the source virtual machine (VM1-S) receives notification from the hypervisor 455 of the target host 451 that a signature, a date and time stamp, and a hash of the checkpoint frame 420 have all been validated. In an embodiment, the notification can also include an indication that the signature, date and time stamp, and hash of an AI accelerator status frame 421 have been validated. The notification may further indicate that the VM1-S migration to target host 451 is complete, and the application and unfinished AI tasks have been restarted at the migrated virtual machine on the target host 451 as VM1-T.

In operation 902, hypervisor 405 and/or driver 404 of the source host 401 can erase at least the secure memory of AI accelerators that were used by the source VM1-S. Hypervisor 405 and/or driver 404 can also erase memory used by the application on VM1-S that made calls to APIs or drivers that use the AI accelerators associated with the application via the virtual function associated with VM1-S.

In operation 903, hypervisor 405 of source host 401 can deallocate resources of the VM1-S, including deallocating AI accelerator resources used by the VM1-S and associated with the virtual function that maps the AI accelerator resources to the VM-S. Method 900 ends.

Figure 10:
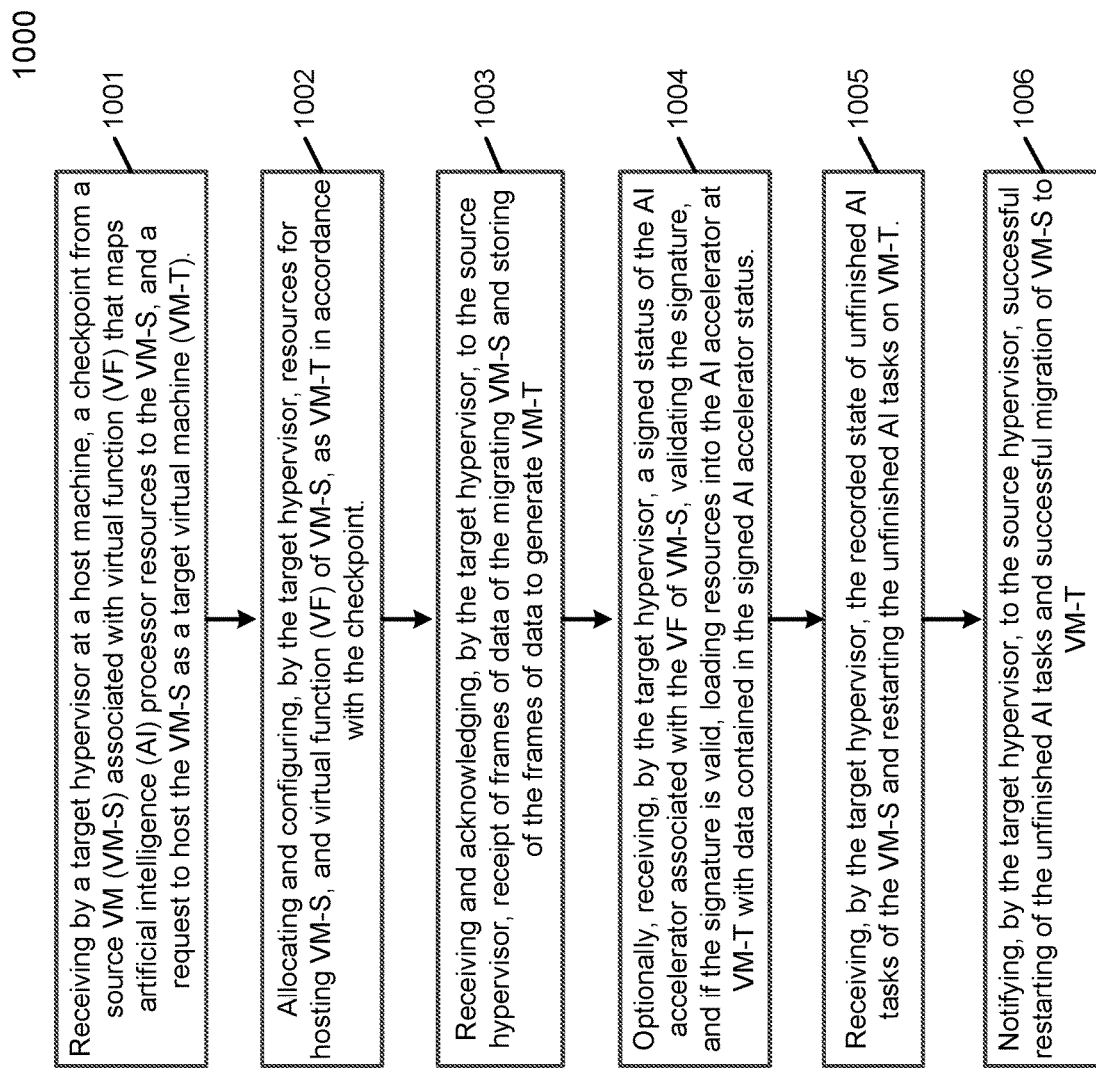
FIG. 10 illustrates a method of migrating a virtual machine of a data processing system having AI accelerators with checkpoint authentication, and optionally AI accelerator status validation, in a virtualized environment, from the perspective of a target hypervisor on a host to the migrated virtual machine, according to some embodiments.

FIG. 10 illustrates a method 1000 of migrating a virtual machine of a data processing system having AI accelerators with checkpoint authentication in a virtualized environment, from the perspective of a target hypervisor of a host that will host the migrated virtual machine, according to some embodiments.

In operation 1001, a hypervisor 455 of the target host machine 451 receives a checkpoint frame 420 from a source virtual machine, e.g., VM1-S, associated with a virtual function that maps AI processor resources to the VM1-S. The hypervisor 455 also receives a request to host the VM1-S as migrated virtual machine (VM1-T) on target host 451.

In operation 1002, hypervisor 455 on host 451 calculates and reserves resources for generating VM1-S on host 451 as VM1-T. Hypervisor 455 allocates and configures resources for hosting VM1-S, and its associated virtual function, in accordance with the received checkpoint frame 420.

In operation 1003, hypervisor 455 at target host 451 receives, and acknowledges to hypervisor 405 at source host 401, frames of data receives as a part of migrating VM1-S to VM1-T. Hypervisor 455 stores the received frames on host 451 so that hypervisor 455 may generate VM1-T.

In operation 1004, optionally, hypervisor 455 at target host 451 receives a signed AI accelerator status frame 421 from hypervisor 505 at source host 401. Hypervisor 455 decrypts the signed AI accelerator frame 421 using a public key of VM1-S, or a public key of an accelerator of VM1-S. Hypervisor 455 validates the date and time stamp in the frame 421, and validates the digest of the frame 421. If the signed AI accelerator status frame 421 is successfully validated, then hypervisor 455 loads data from the AI accelerators status frame 421 into the AI accelerator and configures the AI accelerators in accordance with the data in the AI accelerator status frame 421.

In operation 1005, hypervisor 455 of target host 451 receives the recorded state of unfinished AI tasks of the application running on VM1-S. VM1-T restarts the application and the unfinished AI tasks on VM1-T.

In operation 1006, hypervisor 455 on target host 451 sends a notification to the source hypervisor 405 on source host 401, indicating that the restarting of the application and unfinished AI tasks was successful and the migration of VM1-S to VM1-T was successful.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of migrating a source virtual machine (VM-S) that is executing an application that accesses a virtual function of an artificial intelligence (AI) accelerator, the method comprising:
in response to receiving a command to migrate the VM-S and the virtual function, and receiving a selection of a checkpoint of the VM-S and virtual function to use in performing the migration:
recording, then stopping, one or more executing AI tasks of the application;
generating, or selecting, a status of the AI accelerator associated with the virtual function, wherein the status of the AI accelerator comprises an indication of pending instructions to be processed by the AI accelerator and contents of memory within the AI accelerator comprising one or more registers associated with a processor of the AI accelerator; and
transmitting the checkpoint and the status of the AI accelerator to a hypervisor of a target host to generate a target virtual machine (VM-T); and
in response to receiving a notification that the target host validated the checkpoint and AI status, and has generated and configured resources for generating the VM-T, and has loaded the AI accelerator at the target host with data from the AI accelerator status:
migrating the VM-S and the virtual function to the VM-T.

2. The method of claim 1, further comprising:
in response to receiving a notification that the VM-T has restarted the application and AI tasks, performing a post-migration cleanup of the VM-S and the virtual function, including:
erasing at least a secure memory of the AI accelerator, including any AI inferences, AI models, intermediate results of secure computations, or portions thereof; and
erasing a memory of the VM-S associated with the virtual function, and any calls to the virtual function by the application.

3. The method of claim 1 further comprising:
storing a checkpoint of a state of the VM-S and the virtual function into a storage of a plurality of checkpoints of the VM-S, wherein each checkpoint of the VM-S includes a state of the resources of the VM-S, a state of the application, and a state of the virtual function associated with the resources of AI accelerator.

4. The method of claim 3, wherein the checkpoint further includes:
a recording of one or more executing AI tasks;
configuration information of resources within the AI accelerator communicatively coupled to the VM-S;
a snapshot of memory of the VM-S, including virtual function scheduling information and communication buffers within the one or more AI accelerators; and
a date and time stamp of the checkpoint.

5. The method of claim 1, wherein generating a status of the AI accelerator comprises:
storing, in the AI accelerator status, a date and time stamp of the status;
storing, in the AI accelerator status, the contents of the memory within the AI accelerator, including the one or more registers associated with the processor of the AI accelerator, and a cache, queue, or pipeline of the pending instructions to be processed by the AI accelerator; and
generating a hash of the status of the AI accelerator, and digitally signing the status, hash, and date and time stamp.

6. The method of claim 5, wherein the AI accelerator status further includes one or more register settings indicating one or more other AI accelerators in a cluster of AI accelerators that the AI accelerator is configured to communicate with.

7. The method of claim 1, wherein validating a signature and freshness of the AI accelerator status comprises:
decrypting the signature of the AI status using a public key of the VM-S;
determining that a date and time stamp of the AI accelerator status is within a threshold date and time range; and
validating a hash of the AI accelerator status.

8. A non-transitory computer readable medium programming with executable instructions that, when executed by a processing system having at least one hardware processor that is communicatively coupled to an artificial intelligence (AI) processor, perform operations of migrating a source virtual machine (VM-S) that is executing an application that accesses a virtual function of an artificial intelligence (AI) accelerator of the system, the operations comprising:
in response to receiving a command to migrate the VM-S and the virtual function, and receiving a selection of a checkpoint of the VM-S and virtual function to use in performing the migration:
recording, then stopping, one or more executing AI tasks of the application;
generating, or selecting, a status of the AI accelerator associated with the virtual function, wherein the status of the AI accelerator comprises an indication of pending instructions to be processed by the AI accelerator and contents of memory within the AI accelerator comprising one or more registers associated with a processor of the AI accelerator; and
transmitting the checkpoint and the status of the AI accelerator to a hypervisor of a target host to generate a target virtual machine (VM-T), and
in response to receiving a notification that the target host validated the checkpoint and AI status, and has generated and configured resources for generating the VM-T, and has loaded the AI accelerator at the target host with data from the AI accelerator status:
migrating the VM-S and the virtual function to the VM-T.

9. The medium of claim 8, wherein the operations further comprise:
in response to receiving a notification that the VM-T has restarted the application and AI tasks, performing a post-migration cleanup of the VM-S and the virtual function, including:
erasing at least a secure memory of the AI accelerator, including any AI inferences, AI models, intermediate results of secure computations, or portions thereof; and
erasing a memory of the VM-S associated with the virtual function, and any calls to the virtual function by the application.

10. The medium of claim 8, wherein the operations further comprise:
storing a checkpoint of a state of the VM-S and the virtual function into a storage of a plurality of checkpoints of the VM-S, wherein each checkpoint of the VM-S includes a state of the resources of the VM-S, a state of the application, and a state of the virtual function associated with the resources of AI accelerator.

11. The medium of claim 10, wherein the checkpoint further includes:
a recording of one or more executing AI tasks;
configuration information of resources within the AI accelerator communicatively coupled to the VM-S;
a snapshot of memory of the VM-S, including virtual function scheduling information and communication buffers within the one or more AI accelerators; and
a date and time stamp of the checkpoint.

12. The medium of claim 8, wherein generating a status of the AI accelerator comprises:
storing, in the AI accelerator status, a date and time stamp of the status;
storing, in the AI accelerator status, the contents of the memory within the AI accelerator, including the one or more registers associated with the processor of the AI accelerator, and a cache, queue, or pipeline of the pending instructions to be processed by the AI accelerator; and
generating a hash of the status of the AI accelerator, and digitally signing the status, hash, and date and time stamp.

13. The medium of claim 12, wherein the AI accelerator status further includes one or more register settings indicating one or more other AI accelerators in a cluster of AI accelerators that the AI accelerator is configured to communicate with.

14. The medium of claim 8, wherein validating a signature and freshness of the AI accelerator status comprises:
decrypting the signature of the AI status using a public key of the VM-S;
determining that a date and time stamp of the AI accelerator status is within a threshold date and time range; and
validating a hash of the AI accelerator status.

15. A system comprising at least one hardware processor coupled to a memory programmed with instructions that, when executed by the at least one hardware processor cause the system to perform operations for migrating a source virtual machine (VM-S) that is executing an application that accesses a virtual function of an artificial intelligence (AI) accelerator, the operations comprising:
in response to receiving a command to migrate the VM-S and the virtual function, and receiving a selection of a checkpoint of the VM-S and virtual function to use in performing the migration:
recording, then stopping, one or more executing AI tasks of the application;
generating, or selecting, a status of the AI accelerator associated with the virtual function, wherein the status of the AI accelerator comprises an indication of pending instructions to be processed by the AI accelerator and contents of memory within the AI accelerator comprising one or more registers associated with a processor of the AI accelerator; and
transmitting the checkpoint and the status of the AI accelerator to a hypervisor of a target host to generate a virtual machine (VM-T); and
in response to receiving a notification that the target host validated the checkpoint and AI status, and has generated and configured resources for generating the VM-T, and has loaded the AI accelerator at the target host with data from the AI accelerator status:
migrating the VM-S and the virtual function to the VM-T.

16. The system of claim 15, wherein the operations further comprise:
in response to receiving a notification that the VM-T has restarted the application and AI tasks, performing a post-migration cleanup of the VM-S and the virtual function, including:
erasing at least a secure memory of the AI accelerator, including any AI inferences, AI models, intermediate results of secure computations, or portions thereof; and
erasing a memory of the VM-S associated with the virtual function, and any calls to the virtual function by the application.

17. The system of claim 15, wherein the operations further comprise:
storing a checkpoint of a state of the VM-S and the virtual function into a storage of a plurality of checkpoints of the VM-S, wherein each checkpoint of the VM-S includes a state of the resources of the VM-S, a state of the application, and a state of the virtual function associated with the resources of AI accelerator.

18. The system of claim 17, wherein the checkpoint further includes:
a recording of one or more executing AI tasks;
configuration information of resources within the AI accelerator communicatively coupled to the VM-S;
a snapshot of memory of the VM-S, including virtual function scheduling information and communication buffers within the one or more AI accelerators; and
a date and time stamp of the checkpoint.

19. The system of claim 15, wherein generating a status of the AI accelerator comprises:
storing, in the AI accelerator status, a date and time stamp of the status;
storing, in the AI accelerator status, the contents of the memory within the AI accelerator, including the one or more registers associated with the processor of the AI accelerator, and a cache, queue, or pipeline of the pending instructions to be processed by the AI accelerator; and
generating a hash of the status of the AI accelerator, and digitally signing the status, hash, and date and time stamp.

20. The system of claim 19, wherein the AI accelerator status further includes one or more register settings indicating one or more other AI accelerators in a cluster of AI accelerators that the AI accelerator is configured to communicate with; and wherein validating a signature and freshness of the AI accelerator status comprises:
  decrypting the signature of the AI status using a public key of the VM-S;
  determining that a date and time stamp of the AI accelerator status is within a threshold date and time range; and
validating a hash of the AI accelerator status.

* * * * *